United States Patent [19]
Arihara et al.

[11] Patent Number: 5,822,205
[45] Date of Patent: Oct. 13, 1998

[54] INFORMATION PROCESSING APPARATUS EQUIPPED WITH A GRAPHICAL USER INTERFACE

[75] Inventors: Yoshinori Arihara, Sapporo; Itaru Fukao, Kawasaki, both of Japan

[73] Assignee: Fujitsu Limited, Kawasaki, Japan

[21] Appl. No.: 453,768

[22] Filed: May 30, 1995

[30] Foreign Application Priority Data

Jul. 29, 1994 [JP] Japan .................................. 6-179337

[51] Int. Cl.⁶ .................................................. G05B 19/42
[52] U.S. Cl. .................... 364/191; 364/192; 364/413.22; 395/501; 395/502
[58] Field of Search .................................. 364/191, 188, 364/413.22; 395/161, 155, 157, 158, 700, 650, 275, 146, 501, 156, 153; 340/727; 345/120

[56] References Cited

U.S. PATENT DOCUMENTS

| | | | |
|---|---|---|---|
| 5,047,755 | 9/1991 | Morita | 340/721 |
| 5,119,479 | 6/1992 | Arai et al. | 395/275 |
| 5,129,055 | 7/1992 | Yamazaki et al. | 395/158 |
| 5,365,598 | 11/1994 | Sklarew | 382/13 |
| 5,465,362 | 11/1995 | Orton et al. | 395/700 |
| 5,510,832 | 4/1996 | Garcia | 348/46 |
| 5,522,025 | 5/1996 | Rosenstein | 395/158 |
| 5,524,196 | 6/1996 | Blades | 395/155 |
| 5,613,108 | 3/1997 | Morikawa | 393/616 |

FOREIGN PATENT DOCUMENTS 4-29442 1/1992 Japan .

Primary Examiner—Reba I. Elmore
Assistant Examiner—Ramesh Patel
Attorney, Agent, or Firm—Staas & Halsey

[57] ABSTRACT

A division within an information processing apparatus equipped with a graphical user interface that enables interaction with the operator through multiple kinds of interactive screens of a processing-system program group that collects and communicates data that becomes the basis of displays to the screens, a display-system program group that processes the data in a discretionary display format and displays the data on said interactive screens, and a communication means that performs communication between the said processing-system program group and the display-system program group. Moreover, the enabling of performing communication between each program through communication between ports.

15 Claims, 19 Drawing Sheets

INFORMATION PROCESSING APPARATUS EQUIPPED WITH A GRAPHICAL USER INTERFACE

BACKGROUND OF THE INVENTION

The present invention relates to an information processing apparatus equipped with a graphical user interface.

In recent years, with the spread of the user (customer) base for computer systems, and the diversification of demand by these customers, it becomes more and more important that not only these systems perform their basic inherent functions (mainly such as a monitoring function, a controlling function, and a data operation in a processing-system program group), but also the systems perform other functions of a human machine interface (HMI), such as a data display function and an operability (data display, input operations for the screen, etc. in a display-system program group).

Against this backdrop, and to realize a high-level HMI that satisfies the demands of users, it is essential that a graphic user interface (GUI) be employed that enables user instructions and processing results emerging from the operation of software to be displayed through the use of pointing devices such as mice, etc., to operate buttons, dials, and similar objects displayed on a computer screen.

However, the addition of GUI forces an increase in the scale of development required to realize the display-system program group. Additionally, since the GUI specifications very much depends upon the customers, there are many cases that repeated specification changes are frequently required, making the system developer's job even harder-especially since even a very slight modification of GUI makes it necessary to modify several software modules. This in turn is impeding efficiency improvements in the development of computer systems as a whole, and it is also hindering increases in the reliability of computer systems.

As is apparent from the situation described above, in the development of computer systems employing GUI, in order to increase developmental efficiency and to improve the reliability of the computer system itself, it has been desirable to increase the independence of the display-system program group, necessary for the realization of GUI, of the processing-system program group, which is in charge of original computer functions; i.e., monitoring, control, and data processing. Another goal has been to reduce the extent of the impact of GUI-related revisions to only the extent of the GUI processing modules of the display-system program group. At the same time, to also make it possible to maintain consistency between the data mode used in the processing-system program group and the data mode used within the display-system program group used for the display of the data. Moreover, another desirable factor is the emergence of organizational and developmental methods for computer systems that will be able to respond quickly and easily to the frequent specification changes made for GUI.

To help meet these needs, the windows that are the basis of GUI, as well as the various window parts that are provided for these windows, that have emerged from the development of conventional computer systems employing GUI have been gathered into libraries as GUI parts. These libraries are employed in the creation of display-system program groups. These part libraries are used by developers as GUI construction tools, etc., that have made it possible to perform GUI part placement and editing interactively on the base window.

Within the development of display-system program groups using these kinds of tools for GUI construction, interactive window design is performed through the placement of GUI parts based on display specifications provided by customers. These designs are then stored as exclusive file formats. Also, GUI construction tools are converted into formats that can execute exclusive files only according to source files and displays.

As explained above, the display-system program group is created on the basis of window units.

Furthermore, based on the source files of the display-system program groups created with the said GUI construction tools, all processing that was not at all processed within the source file using GUI construction tools such as control of the display-system program group, the acquisition of data for the display from the processing-system program group, and changes in the window-display status as a result of display data, etc. have had to be developed within programs, with the developer always bearing in mind the need for interface consistency with the processing-system program group.

Additionally, within the processing-system program group, it is necessary to either build the said display-system program through direct processing, or to perform processing according to the form of the display-group program. Thus, it is necessary to perform processing within the development of the computer system as a whole; i.e., the development of the display-system program group must be performed in close conjunction with the development of the processing-system program group.

For this reason, 1) even when there are no changes made to the basic functions of a system, changes in the screen layout or configuration require corrections in the overall system program; 2) ordinarily, since display screens and GUI parts differ for each customer, even though their basic functions are similar, it is necessary to develop separate system programs; and 3) processing-system program developers must now understand the specs of display-system programs, while display-system developers must understand the specifications of processing-system programs.

In view of the above-described defects, an object of the present invention is to efficiently provide a computer system with GUI to realize a computer system equipped with specialized communication functions that make it possible to deliver data between the processing-system program group and the display-system program group while maintaining the independence of both of these groups.

SUMMARY OF THE INVENTION

According to the present invention, there is provided an information processing apparatus equipped with a graphical user interface that enables operator interaction with multiple kinds of interactive screens, comprising:

a processing-system program group that collects and communicates data used as the basis for displays to the screen; and a display-system program group that processes the data in a discretionary display format for display on the interactive screens, and a communication mechanism that performs communication between the processing-system program group and the display-system program group;

wherein the communication mechanism receives data communicated from the processing-system program group for display on the interactive screen, and is comprised of a display port that takes this data and sends it as input to the discretionary display-system program group;

an input port that receives data created through operations by the operator on the display-system program group to be communicated to the processing-system program, and that sends this data to the prescribed processing-system program; and a control port that, in the case where data has been generated by the processing-system program that must be communicated immediately to the operator, then, in order to display such data on a specified interactive screen, directly activates the display-system program and transmits this data.

The operator uses the interactive screen to interact with the display-system program group.

The processing-system program group is a program for collecting and processing data that will become the basis of the display.

The communication mechanism that is the special characteristic of the present invention is placed between the processing-system program group and the display-system program group, and is comprised of a display port, an input port, and a control port.

The display port receives data for screen display from the processing program of the processing-system program group, and delivers this data to the display-system program group.

The input port receives data from the display program of the display-system program group. This is data that has been generated from operations by the operator on the interactive screen, for example, operations using pointing devices such as a mouse, etc. The input port that receives this data delivers it as data for the processing program of the processing-system program.

The control port, in those cases when within whichever processing program of the processing-system program group emergency data has been generated that the operator must be immediately informed of, immediately receives such data, activates the display program of the corresponding display-system program group, and urges caution to the operator by displaying the emergency data by means of the display program.

In this way, the present invention, when developing computer systems equipped with a graphical user interface, in addition to the display-system program group and the processing-system program group, in order to make both of these perfectly independent and separate, absorbs within an exclusive communication mechanism (port) inconsistencies in generated data and the creation of complex interface programs in order to realize the separation and independence of the display-system program and the processing-system program.

Thus, 1) it is possible to execute asynchronous processing of the display-system program and of the processing-system program, and 2) in order to respond to the discretionary configuration of the interactive screen, freedom of configuration of the display-system program is enabled without impacting the processing-system program, and 3) execution of the processing-system program independently of the display-system program configuration is enabled; for example, it is possible to control the display screen in response to emergencies such as fires, etc.

DESCRIPTION OF THE PREFERRED EMBODIMENTS

Figure 1:
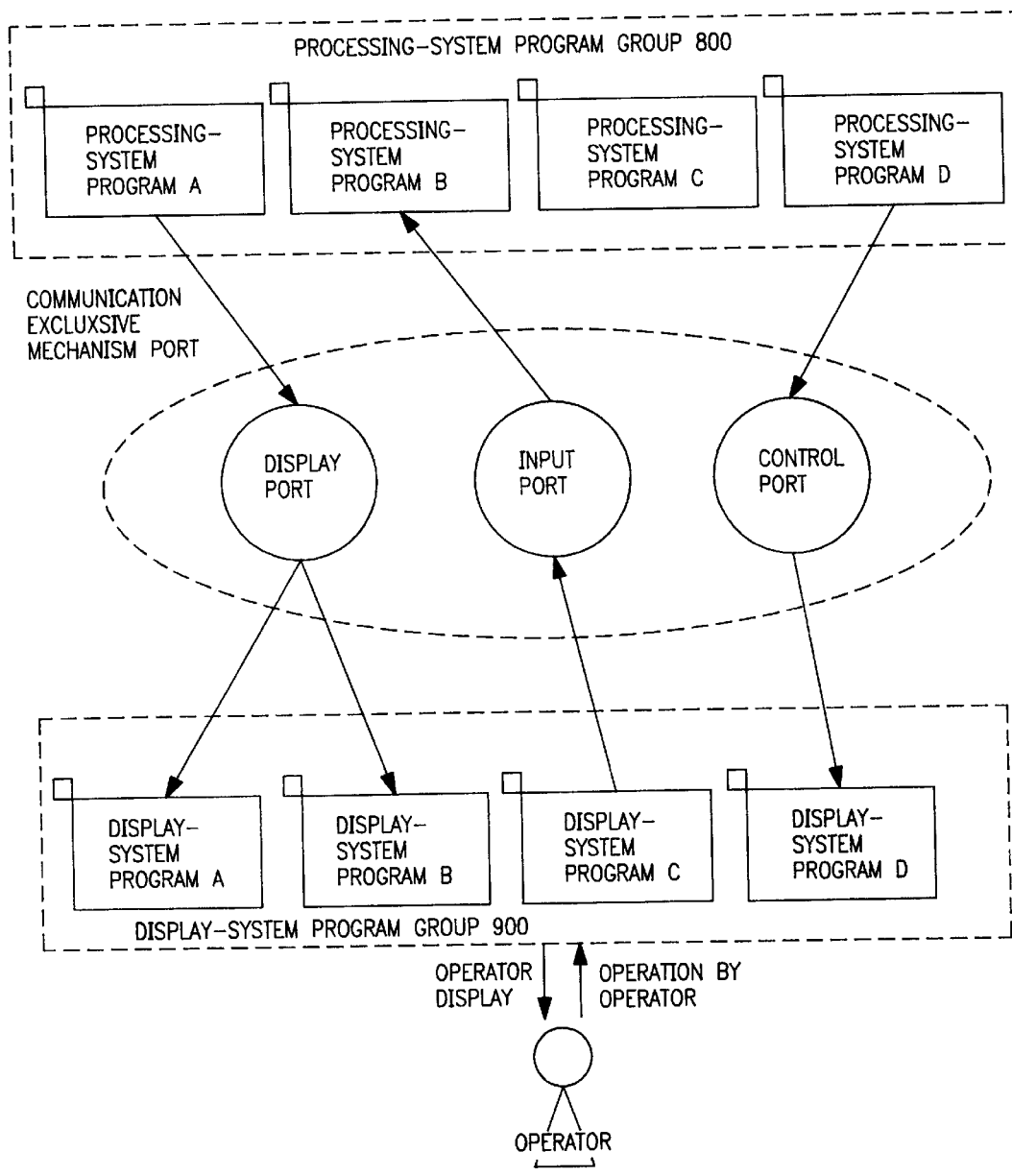
FIG. 1 is a theoretical diagram of the present invention.

Prior to explaining concrete preferred embodiments, FIG. 1 will be used to explain the concepts of the present invention.

FIG. 1 shows a theoretical diagram of the present invention, in which reference numeral 800 denotes a processing-system program group (processing programs A–D are shown in a line), and reference numeral 900 denotes a display-system program group (display programs A–D are shown in a line).

The operator performs manipulations on the display-system program group 900 through the interactive screen.

The processing-system program group 800 is a program for collecting and processing data that will become the basis for displays.

A communication mechanism that is a feature of the present invention is placed between the processing-system program group 800 and the display-system program group 900, and is comprised of a display port, an input port, and a control port.

The display port receives data for screen display from the processing program (processing program A in the diagram) of the processing-system program group 800, and delivers this data to the display-system program group 900 (display programs A and B in the diagram).

The input port receives data from the display program (display program C in the diagram) of the display-system program group 900. This is data that has been generated in response to operations by the operator on the interactive screen, for example, operations using pointing devices such as a mouse, etc. The input port that receives the data delivers it as data for the processing program (processing program B) of the processing-system program group 800.

The control port, in the case where any one of the processing programs of the processing-system program group 800 (i.e., processing program D), emergency data have been generated that should be immediately noticed to the operator, immediately receives such data, activates the corresponding display program (display program D) of the display-system program group 900, and urges caution to the operator by displaying the emergency data by means of the display program.

Figure 2:
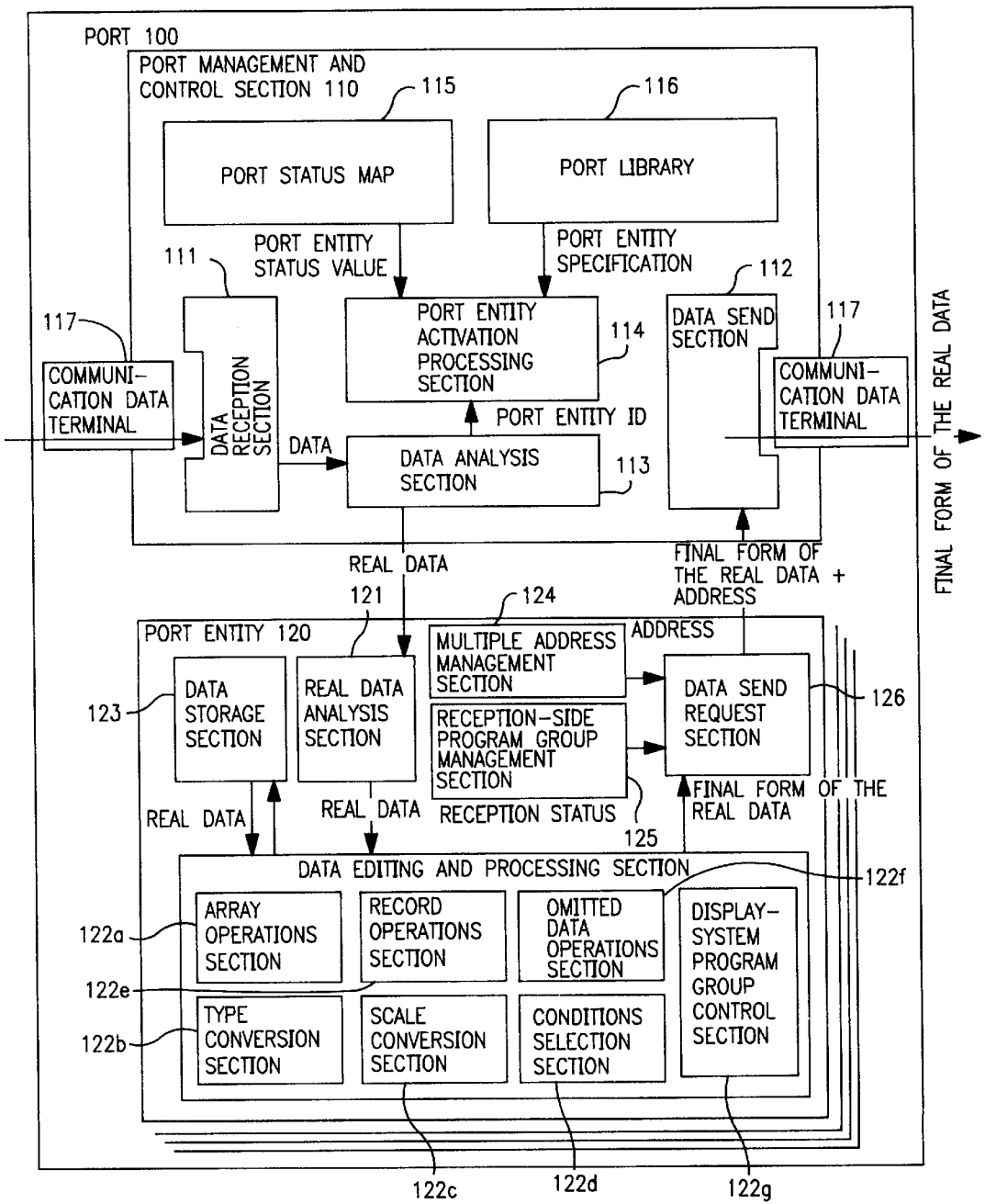
FIG. 2 is a block diagram showing the basic configuration of the port of the present invention.

FIG. 2 is a block diagram showing the configuration of the port referred to in all of the preferred embodiments 1–15 described below.

In FIG. 2, reference numeral 100 means any one of the input port, the display port, and the control port.

Reference numeral 110 is the port management and control section, comprised of data reception section 111, data send section 112, data analysis section 113, port entity activation processing section 114, port status map 115, port library 116, and communication terminal 117.

The data reception section 111 has the function of receiving data from the processing-system program group or the display-system program group via the communication terminal 117.

The data send section 112 has the function of transmitting data from the processing-system program group or the display-system program group via the communication terminal 117.

The data analysis section 113 analyzes the received data from the processing-system program group or the display-system program group obtained from the data reception section 111, and has the function of acquiring real data to be sent to the display-system program group or the processing-system program group, as well as the port entity ID to be activated.

The port entity activation processing section 114 has the function of performing activation processing of the port entity to be used.

The port status map 115 is equipped with the function of responding to and managing the port entity ID and the status (activated/inactivated) of the port to be identified by the port entity ID.

The port library 116 is controlled by the port entity activation processing section 114, and port specifications and attribute information are stored therein.

A port entity 120 shown in the bottom half of FIG. 2 is comprised of real data analysis section 121, data editing and processing section 122, data storage section 123, multiple address management section 124, reception-side program group management section 125, and data send request section 126.

The real data analysis section 121 has the function of analyzing the real data obtained at the data analysis section 113 and classifying the data according to the editing mode.

The data editing and processing section 122 has the function of processing and editing the real data into a format that can be sent.

The data storage section 123 has the function of storing the real data to be manipulated at the data editing and processing section 122.

The multiple address management section 124 has the function of, in the case where multiple reception-side display programs exist, managing those addresses.

The reception-side program group management section 125 monitors and manages the execution status of the reception-side display-system program.

The data send request section 126 has the function of requesting the sending of the real data's final form of the real data send section 112, based on the final form of the real data processed and edited at the data editing and processing section 122, the address list from the multiple address management section 124, and the reception status information from the reception-side program group management section 125.

Moreover, the data editing and processing section 122 is comprised of array operations section 122a, which stores as fixed-number arrays the specified real data stored within the data storage section 123; type conversion section 122b, that performs type conversions on received real data according to the sending address, and scale conversion section 122c, that transforms the scale of measurements and units, and conditions selection section 122d that selects only data that corresponds to the specified conditions; record operations section 122e that stores as a single record the differing real data stored in the data storage section 123; and omitted data operation section 122f that, in the case where there are omissions of data that should have been received in time sequence, selects whether 1) to store the previous data, or 2) to store the data without a data update, or 3) to store the data with the data omission intact, that supplies the missing data; and display-system program group control section 122g, that controls the activation of the display-system program that displays a specified interactive screen in response to the generation of emergency data that must be communicated immediately to the operator.

In FIG. 2, when the processing-system program group or the display-system program group that is the data sender (below, "the sending-side program group") generates a request for data communication from the display-system program group or the processing-system program group that is the data receiver (below, simply "the reception-side program group"), first the sending-side program group performs a data transmission to port 100.

When data are transmitted from the sending-side program group via the communication terminal 117, the data reception section 111 receives the data, and sends the data to the data analysis section 113.

The data analysis section 113 performs data analysis, and acquires the port entity ID to be used and the actual data (below, "real data") to be communicated with the reception-side program group.

Furthermore, the data analysis section 113 transmits the port entity ID to the port entity activation processing section 114.

The port entity activation processing section 114 uses the port entity ID transmitted from the data analysis section 113 and the port status map 115 to identify whether the status of the port entity 120 that is to be identified by the port entity ID is in an activated state or not.

Here, in the case where the port entity is in a state of inactivation, the port entity activation processing section 114 acquires port entity specifications and the sending address list from the port library 116, and based on the port specifications, activates the port entity 120. At that time, the sending address list is transmitted to the multiple address management section 124 of the port entity.

Subsequently, the real data obtained from the data analysis section 113 is transmitted to the port entity 120. The real data analysis section 121 within the port entity 120 analyzes the received real data, identifies the data editing key that determines in what format the data will be edited, and communicates this to the data editing and processing section 122.

The data editing and processing section 122 performs data editing according to the format of the received data, and processes the real data format into a form that conforms to reception-side program group input.

Here, when the operator wishes to manipulate real data as serial time series data, the array operations section 122a of the data editing and processing section 122 stores each item of real data within the data storage section 123, and fetches a specified number of real data in an array format as the data are being stored.

In the case where type conversion of the real data is required, the type conversion section 122b of the data editing and procession section 122 performs type conversions on the real data. In the case where measurement/unit conversions are required, the scale conversion section 122c performs scale conversions on the real data, and in the case where only data that conforms to prescribed conditions is to be transmitted, the conditions selection section 122d performs comparisons and selection based on the fixed conditions.

Conversely, in the case where multiple kinds of real data are to be treated as a single record, the record operations section 122e stores each item of real data in the designated record of the data storage section 123, and after all of the fields of the specified record have been completely gathered, the record operations section 122e performs read-out processing using the record format.

For real data that are to be measured in fixed time intervals, when there are omitted data, the omitted data operation section 122f selects whether to 1) supplement the directly previous data as the omitted data, or 2) supplement data that has not undergone a data update as the omitted data, or 3) supplement data that are no data as the omitted data, and performs supplementary processing of the omitted data.

For emergency data, the display-system program group control section 122g immediately activates the display-system program that displays a specified interactive screen.

When editing of the real data is completed as stated above, the data editing and processing section 122 sends the final form of the real data to the data send request section 126.

The data send request section 126, according to the final form of the real data and the address list from the multiple address management section 124, requests the data send section 112 to send the final form of the real data to its reception-side program.

However, in the case where the reception-side program group is a display-system program group, the status of the reception-side program management by the reception-side program group management section 125 is checked, and, if the reception-side program is executing, the final form of the data is transmitted, but if it is stopped, either the data are re-sent when the reception-side program is executing, or the data are deleted.

The data send section 112 that has received a send request from the data send request section 126 transmits the final form of the real data via the communication terminal 117 to the reception-side program group.

Below, preferred embodiments 1–15 are explained separately in detail.

Preferred Embodiment 1

Figure 3:
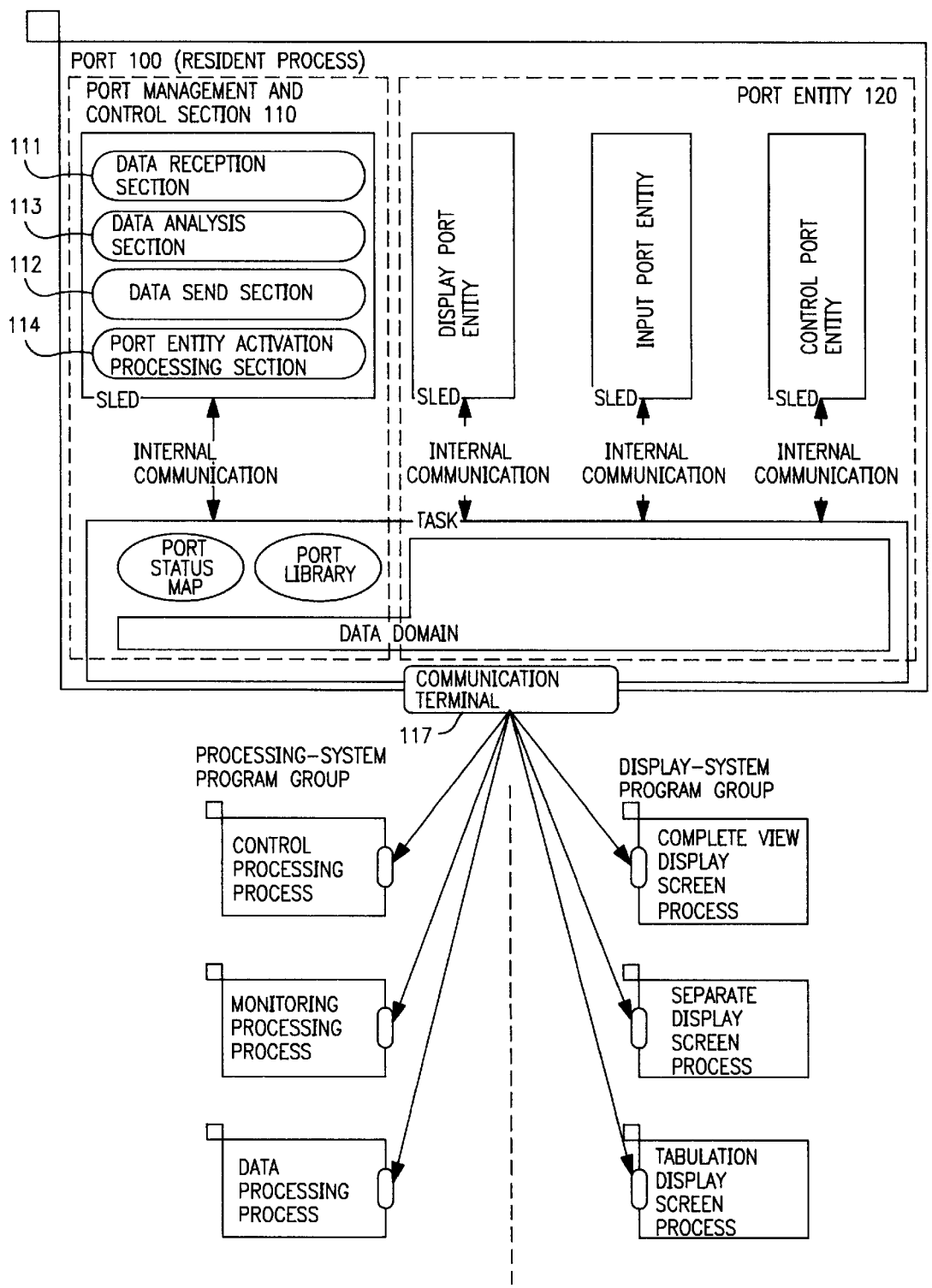
FIG. 3 is a block diagram showing the system configuration as described in preferred embodiment 1 of the present invention.

FIG. 3 is a diagram of the computer system configuration that comprises a preferred embodiment of the present invention.

In FIG. 3, port 100 is realized as the resident process within the computer. Here, "process" means the unit of function execution within the computer. The process is comprised of a single task or multiple sleds, and when the process executes the functions, the processing command is realized, and the management of computer resources such as the memory domain, etc., that comprise the environment for the execution of sled processing commands is performed through the task. Also, this has the special characteristic that, compared with creation/extinguishment of processes, the load on the computer for the creation/extinguishment of sleds is extremely small.

The port management and control section 110 within port 100 is comprised of the task that is the execution environment of the process, and the sled that is the embodiment of the execution command. Here, the port status map 115 and the port library 116 function as the task, while the data reception section 111, the data send section 112, the data analysis section 113, and the port entity activation processing section 116 function as the sled.

As stated above, the port entity 120 is realized from the task and the sled. In the case of port entity 120, only the memory domain (data domain) that is the data save repository functions as a task.

In the case where communication of data from the processing-system program group to the display-system program group is to be performed, each processing process of the processing-system program group creates a socket that is connected to the communication terminal 117 that is the socket of port 100. Display data are transmitted via the connected communication terminal 117 from each process of the processing-system program group to port 100. Within the data reception section 111 of the port management and control section 110 within port 100, the data analysis section 113 analyzes the received data, detects the real data and the port entity ID to be used, and, based on this port entity ID, the port entity activation processing section 114 activates the display port entity within port entity 120. The display port entity that has been activated receives the real data via the data domain of the task, and, after performing internal processing consisting of type conversions, scale conversions, conditions selection, array operations, record operations, and missing data operations, attaches an address to the final form of the real data, and transmits the data to the data send section 112 once again via the data domain of the task; upon receiving this, the data send section 112 refers to the address, and, for each process of the display-system program group, sends the data via the communication terminal 117.

In the case where, through screen operations and input processing by the operator, data are communicated to the processing-system program group for each process of the display-system program group, in the same order mentioned above that occurs in the case where data is communicated from the processing-system program group to the display-system program group, the port receives the data, the activation of the input port is performed, and, following port internal processing, the real data and address are transmitted to the data send section 112, and, according to the address, the data send section 112 sends this data via the communication terminal 117 that is the socket for each process of the processing-system program group.

In the case where emergency communication data are generated within the processing-system program group for the display-system program group, in the same order mentioned above that occurs in the case where data is communicated from the processing-system program group to the display-system program group, the port receives the data, the activation of the control port is performed, and, following port internal processing, each process of the display-system program group that comprises the address is immediately activated, the real data and the address are transmitted to the data send section 112, and, according to this address, the data send section 112 sends the data for each activated process of the display-system program group via the communication terminal 117, which is the socket.

Preferred Embodiment 2

Figure 4:
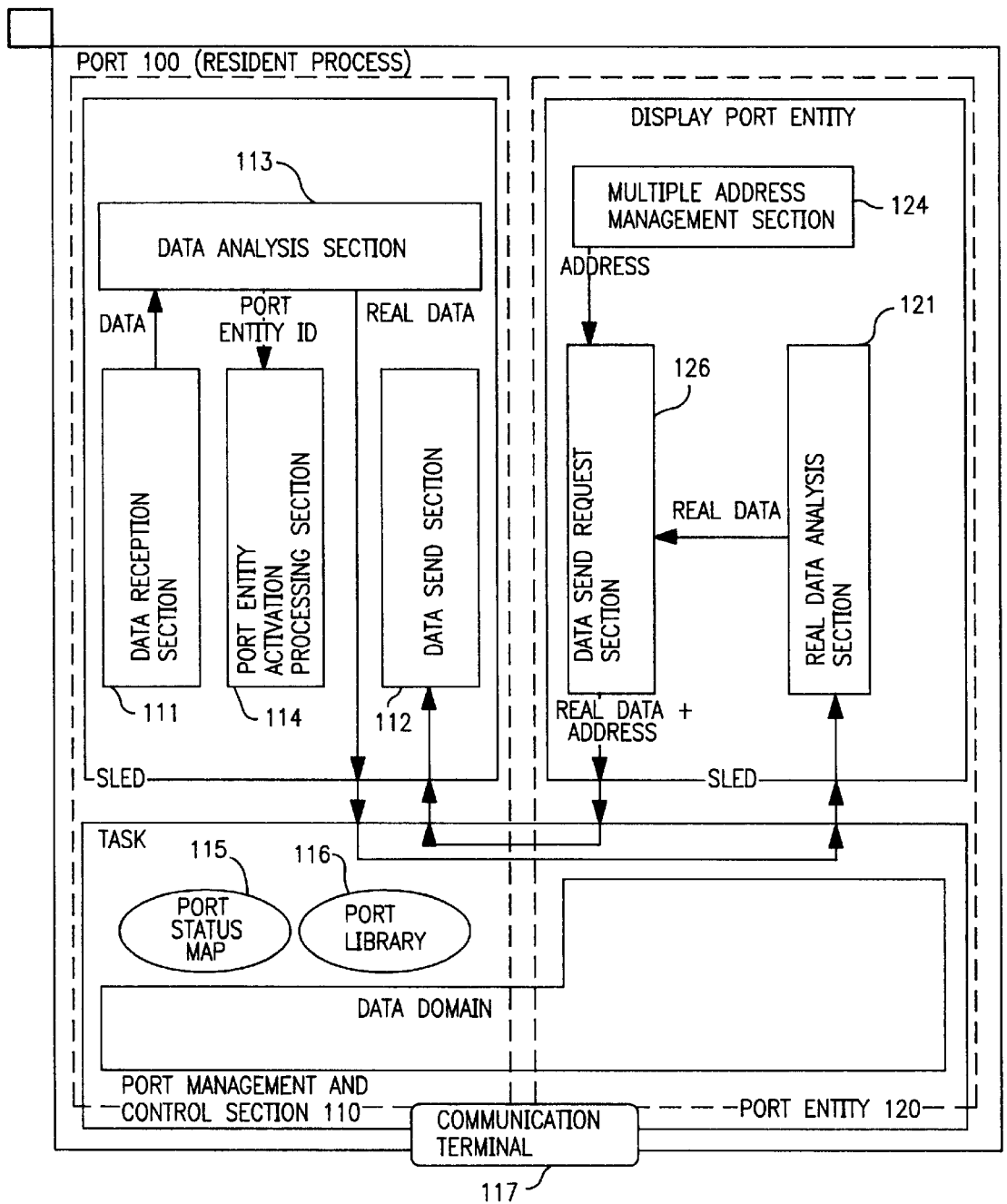
FIG. 4 is a block diagram showing the multiple addressing mechanism of the display port as described in preferred embodiment 2 of the present invention.

FIG. 4 is a preferred embodiment of a display port equipped with a multiple address management mechanism. Within the figure, the data reception section 111, the data send section 112, the data analysis section 113, the display port entity activation processing section 114, the real data analysis section 121, the multiple address management section 124, and the data send request section 126 within each respective sled are realized as the internal functions of each sled.

The data reception section 111 transmits data received from the processing-system program group via the socket, communication terminal 117, to the data analysis section 113, and, based on the data, the data analysis section 113 executes data analysis, acquires the port entity ID to be used and the real data, and this port entity ID is delivered to the port entity activation processing section 114, and the port entity 120 to be used is activated. The real data are delivered through internal communication between the task and the sled to the real data analysis section 121 of the display port entity, and following structural analysis of the data, it is delivered to the data send request section 126. Furthermore, the data send request section 126 receives an address from the multiple address management section 124, and, via internal communication between the task and the sled, transmits the real data and address to the data send section 112. Upon reception, the data send section 112 transmits the real data to the display-system program that is the address.

Preferred Embodiment 3

Figure 5:
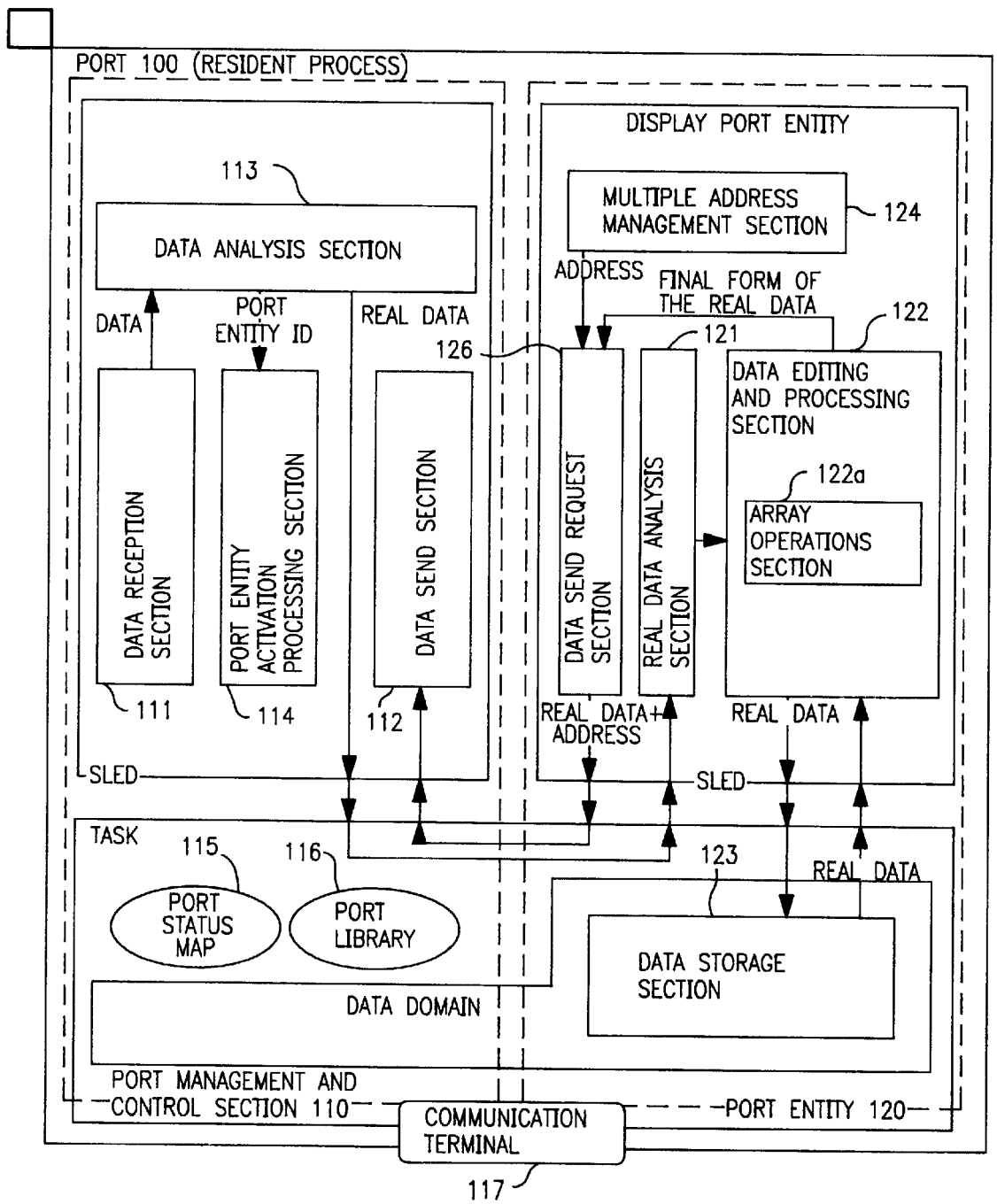
FIG. 5 is a block diagram showing the array operations mechanism of the display port as described in preferred embodiment 3 of the present invention.

FIG. 5 shows a preferred embodiment configuration of the display port that enables delivery of display data in array format and that is equipped with a data storage mechanism.

In FIG. 5, the data reception section, the data send section 112, the data analysis section 113, the port entity activation processing section 114, the real data analysis section 121, the data editing and processing section 122 (the array operations section 122a), the multiple address management section 124, and the data send request section 126 within each respective sled are realized as the internal functions of each sled.

The data storage section 123 is realized within the computer memory domain, and data received from the processing-system program via the socket, communication terminal 117, are delivered from the data reception section 111 to the data analysis section 113, and data analysis is performed within this data analysis section 113, and the port entity ID to be used and the real data is obtained. The port entity ID is relayed to the port entity activation processing section 114, and the activation of the port entity 120 to be used is performed. The real data, through internal communication between the task and the sled, are delivered to the real data analysis section 121 of the display port entity, and, following structural analysis of the data, the data are delivered to the array operation section 122a that comprises the data editing and processing section 122. Until it filled with the prescribed arrays, the array operation section 122a stores the real data within the data storage section 123, and when all of the real data is gathered, the real data set is delivered as array format data to the data send request section 126. Furthermore, the data send request section 126 receives an address from the multiple address management section 124, and, via internal communications between the task and the sled, transmits the real data and the address to the data send section 112. Upon reception, the data send section 112 sends the array format data to the display-system program that is the address.

Preferred Embodiment 4

Figure 6:
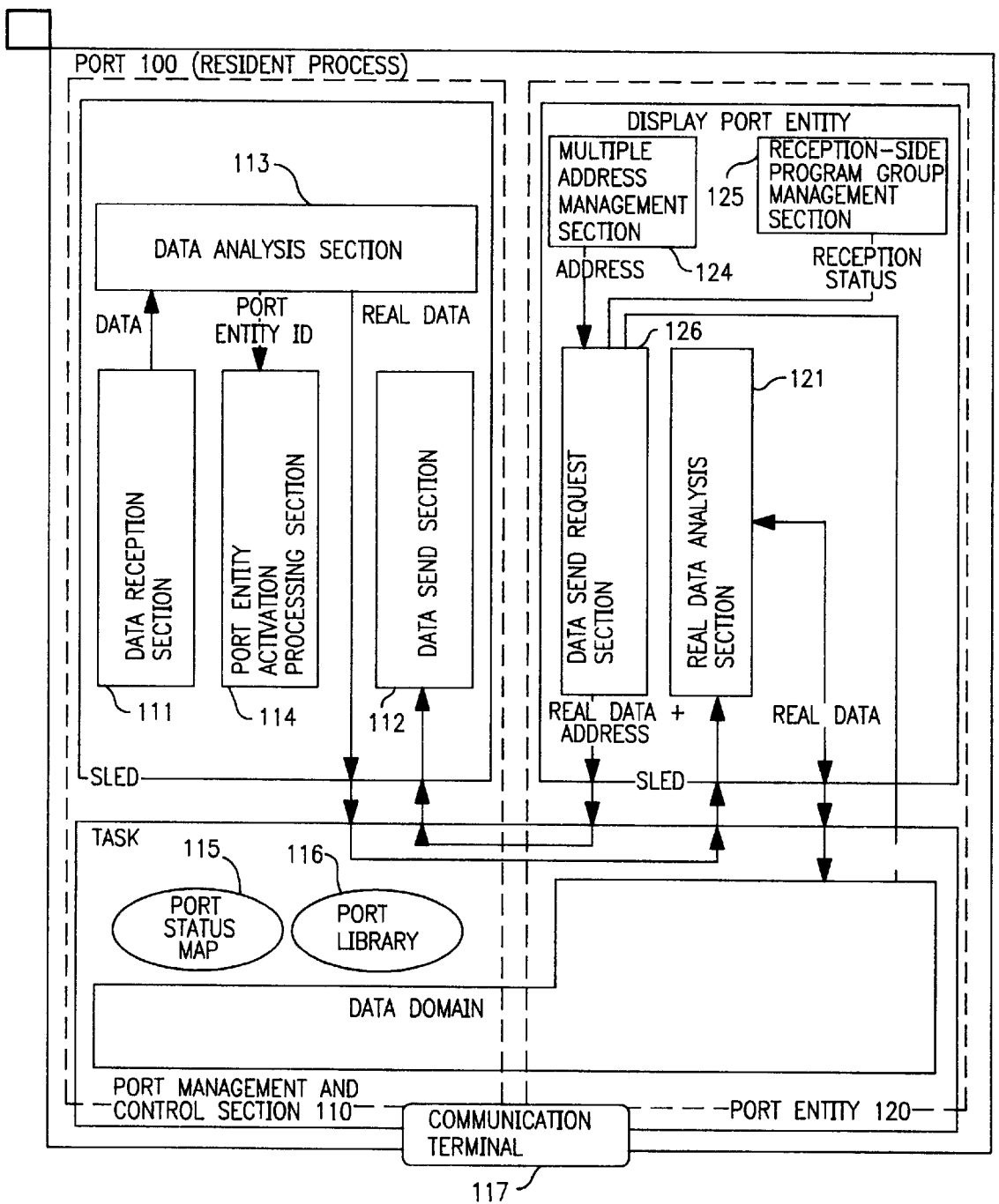
FIG. 6 is a block diagram showing the reception-side program group management mechanism of the display port as described in preferred embodiment 4 of the present invention.

FIG. 6 is an embodiment of a configuration of a display port that enables to choose between immediate sending, retention, or erasure of data according to the execution status of the display-system program of the data reception-side, and that is equipped with a data storage mechanism and a reception-side program group management mechanism.

In FIG. 6, the data reception section 111, the data send section 112, the data analysis section 113, the port entity activation processing section 114, the real data analysis section 121, the multiple address management section 124, the reception-side program group management section 125 and the data send request section 126 within each respective sled are realized as the internal functions of each sled. Also, the data storage section 123 is realized within the memory domain of the computer system.

When data are received by the data reception section 111 from the processing-system program via the socket, communication terminal 117, the data are delivered to the data analysis section 113, and the data analysis section 113 analyzes the data, and acquires the port entity ID to be used and the real data. The port entity ID is delivered to the port entity activation processing section 114, and the port entity 120 to be used is activated. Real data are delivered through internal communication between the task and the sled to the real data analysis section 121 of the display port entity, and, following structural analysis of the data, the data are stored within the data storage section 123.

Next, the data send request section 126 receives a communication from the reception-side program group management section 125 concerning the status of the display-system program, in other words, whether it is executing or is stopped, and, if it is stopped, the data send request section 126 receives communication whether to annul the data or retain it for resending or, if it is executing, the data send request section 126 receives real data from the data storage section 123. Furthermore, the data send request section 126 receives an address from the multiple address management section 124, and transmits the real data and the address via internal communication between the task and the sled to the data send section 112. Upon reception, the data send section 112 sends array format data to the display-system program that is the address.

Preferred Embodiment 5

Figure 7:
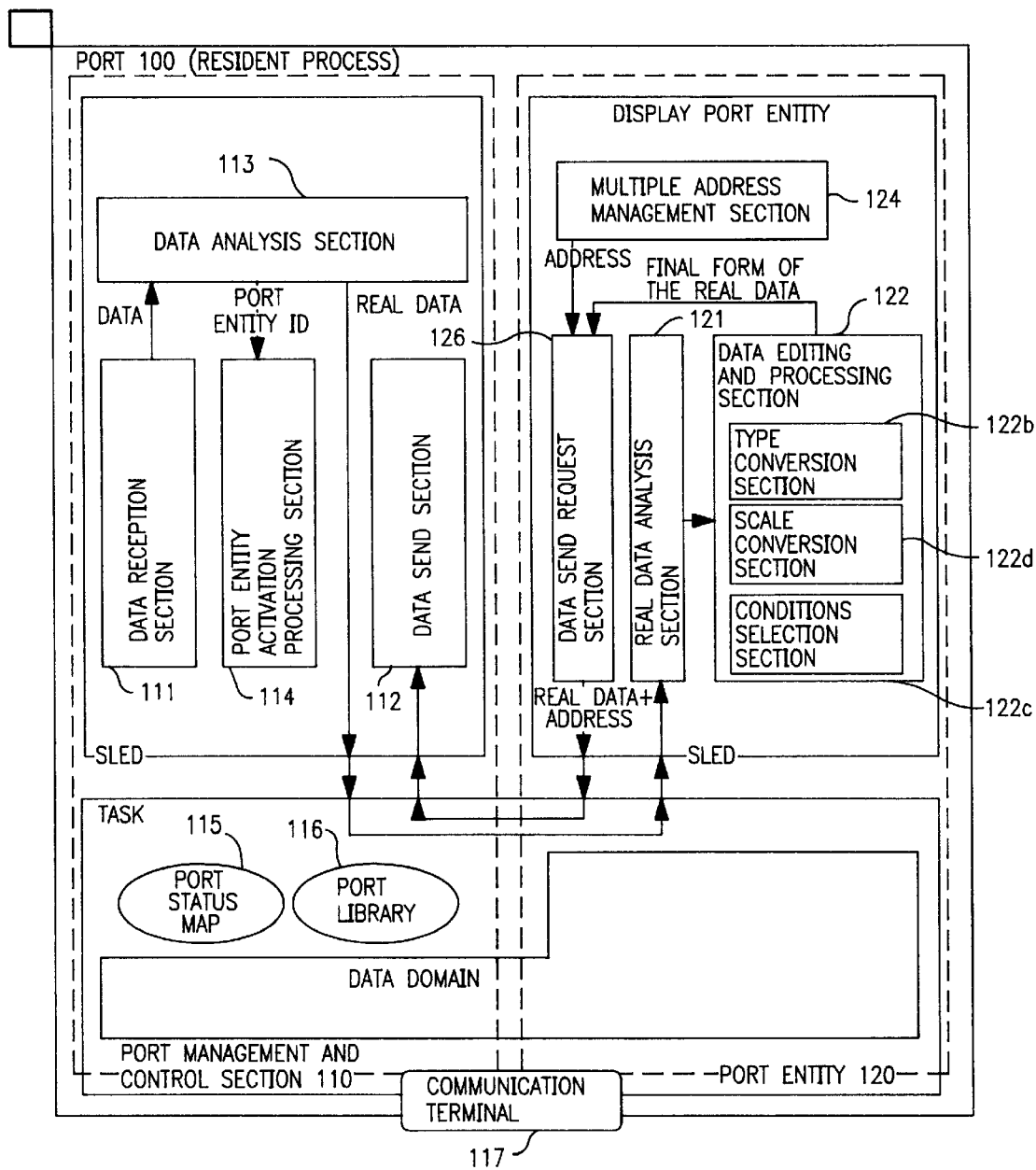
FIG. 7 is a block diagram showing the data format conversion mechanism of the display port as described in preferred embodiment 5 of the present invention.

FIG. 7 shows a preferred embodiment of a configuration of the display port that enables delivery of display data following execution of format conversion of display data. Within the figure, the data reception section 111, the data send section 112, the data analysis section 113, the port entity activation processing section 114, the real data analysis section 121, the data editing and processing section 122 (the type conversion section 122b, the scale conversion section 122c, the conditions selection section 122d), the multiple address management section 124, and the data send request section 126 within the sleds are realized as the internal functions of each sled.

The data reception section 111 receives data from the processing-system program via the socket, communication terminal 117, and delivers the data to the data analysis section 113. The data analysis section 113 analyzes the data, and acquires the port entity ID to be used and the real data. Here, the port entity ID is delivered to the port entity activation processing section 114, and the port entity 120 to be used is activated. Real data are delivered through internal communication between the task and the sled to the real data analysis section 121 of the display port entity, and, following structural analysis of the data, in order to perform required data format conversion, the data are delivered to each functional section of the data editing and processing section 122; i.e., the type conversion section 122b, the scale conversion section 122c, and the conditions selection section 122d.

Here, within the type conversion section 122b, type conversion is performed, whereby the display data are converted from integer-type data to character-type data; and, within the scale conversion section 122c, scale conversion is performed according to the measurement/unit of the display data; and, within the conditions selection section 122d, only data that conforms to specified conditions is extracted.

The data that have completely undergone format transformation as stated above are delivered to the data send request section 126 as the final form of the real data. Furthermore, the data send request section 126 receives an address from the multiple address management section 124, and, via internal communications between the task and the sled, the data send request section 126 transmits the real data and the address to the data send section 112. Upon reception, the data send section 112 sends this format-converted data to the display-system program that is the address.

Preferred Embodiment 6

Figure 8:
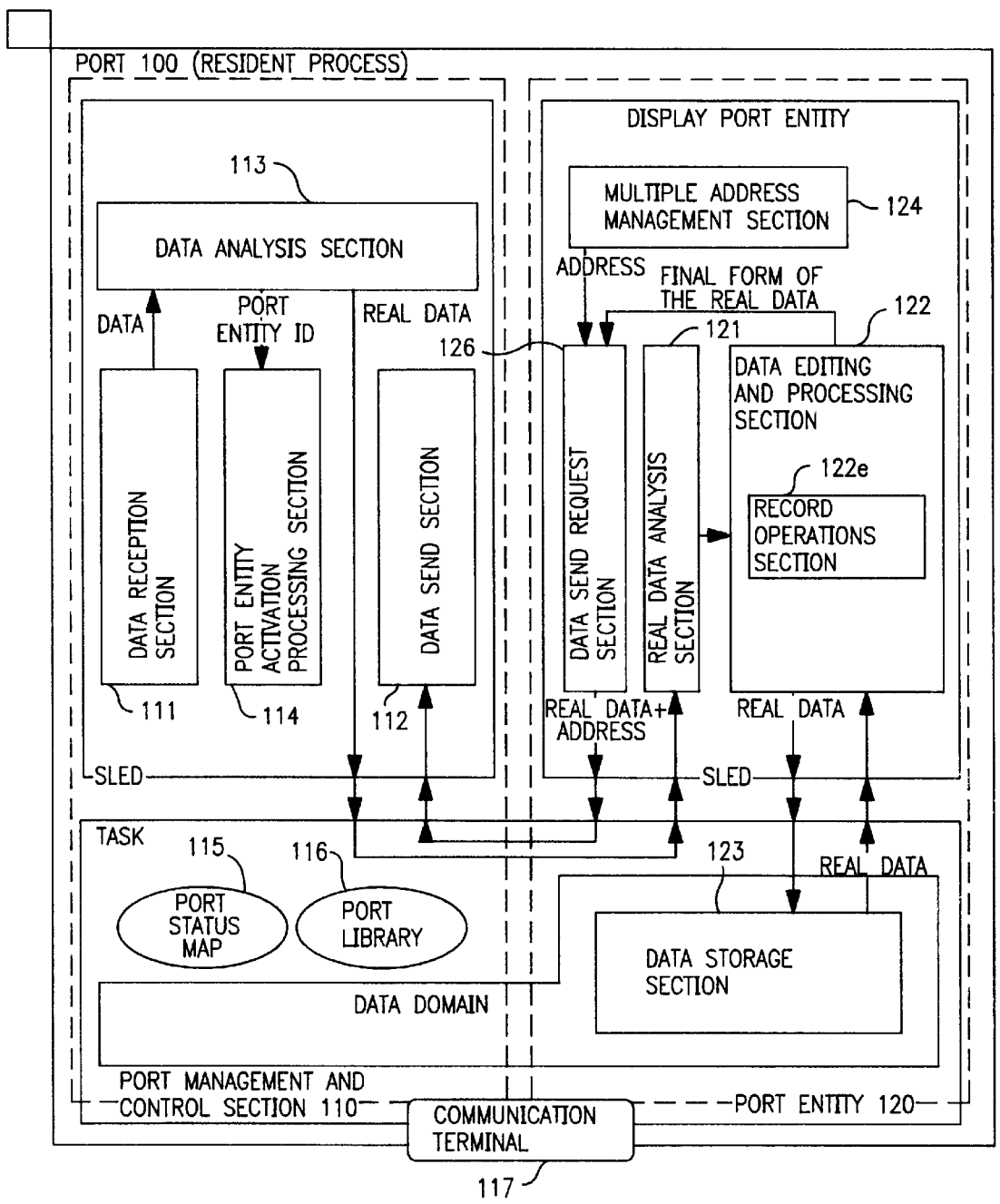
FIG. 8 is a block diagram showing the record operations mechanism of the display port as described in preferred embodiment 6 of the present invention.

FIG. 8 shows a preferred embodiment configuration of a display port that enables the delivery in record data format of multiple display data that are sent from multiple processing-system programs.

In FIG. 8, the data reception section 111, the data send section 112, the data analysis section 113, the port entity activation processing section 114, the real data analysis section 121, the data editing and processing section 122 (the record operations section 122e), the multiple address management section 124, and the data send request section 126 within each respective sled are realized as the internal functions of each sled. Also, the data storage section 123 is realized within the memory domain of the computer system.

In this preferred embodiment, when the data reception section 111 receives data from the processing-system program via the socket, communication terminal 117, it transmits the data to the data analysis section 113, and acquires the port entity ID to be used and the real data. Here, the port entity ID is relayed to the port entity activation processing section 114, and the activation of the port entity 120 to be used is performed.

Meanwhile, the real data, through internal communication between the task and the sled, are delivered to the real data analysis section 121 of the display port entity, and, following structural analysis of the data, the identifier of the data for record operations included in the data is identified, and the data are delivered to the record operations section 122e. Until it fills the prescribed records, the record operations section 122e stores the real data in the data storage section 123, and the full-field real data set is delivered as record data to the data send request section 126. Furthermore, the data send request section 126 receives an address from the multiple address management section 124, and, via internal communications between the task and the sled, the data send request section 126 transmits the real data and the address to the data send section 112. Upon reception, the data send section 112 sends this record format data to the display-system program that is the address.

Preferred Embodiment 7

Figure 9:
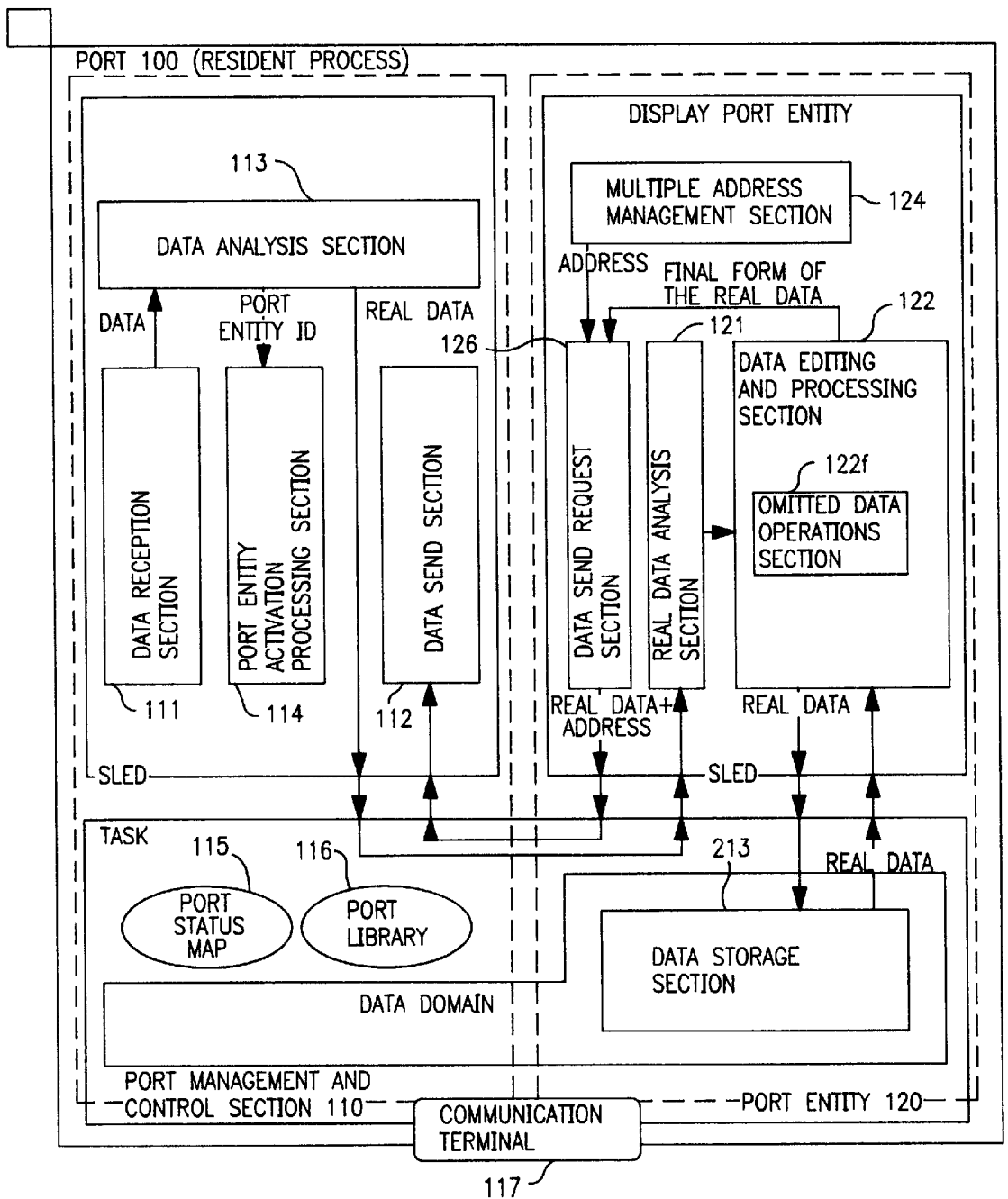
FIG. 9 is a block diagram showing the omitted data operations mechanism of the display port as described in preferred embodiment 7 of the present invention.

FIG. 9 shows a preferred embodiment of a configuration of a display port that, when manipulating data to be measured in fixed time intervals, for omitted generation of observation-point data at the time such data are originally to have been measured, enables the supplementation of data just prior to the omission-generation, data that show no update, or data that show non-observed data.

In FIG. 9, the data reception section 111, the data send section 112, the data analysis section 113, the port entity activation processing section 114, the real data analysis section 121, the omitted data operations section 122f that is the data editing and processing section 122, the multiple address management section 124, and the data send request section 126 within each sled are realized as the internal functions of each sled; and the data storage section 123 is realized within the memory domain of the computer system. The data reception section 111 transmits data received from the processing-system program via the socket, communication terminal 117, to the data analysis section 113, and this data analysis section 113 performs data analysis, and acquires the port entity ID to be used and the real data, and the port entity ID is relayed to the port entity activation processing section 114, and the activation of the port entity 120 to be used is performed.

The real data, through internal communication between the task and the sled, are delivered to the real data analysis section 121 of the display port entity, and, following structural analysis of the data, the observation point and value are delivered to the omitted data operations section 122f that is the data editing and processing section 122. The omitted data operation section 122f monitors the time intervals of the observation point, and, in the case where data are arriving in the normal sequence, temporarily stores the value of observation point data within the data storage section 123, and performs sequence rearrangement. When, during observation, an error exists in the time interval, for those observation points which are omitted data times, the omitted data operations section 122f selectively assigns data that shows 1) just-previous observation-point data, 2) data that shows no update, and 3) data that shows non-observed data. The selection of an assigned value at this time is previously defined as an attribute in the port library, and is established as a port specification at the time of port activation processing. Assigned data are delivered as the final form of the real data to the data send request section 126. Furthermore, the data send request section 126 receives an address from the multiple address management section 124, and, via internal communications between the task and the sled, the data send request section 126 transmits the final form of the real data and the address to the data send section 112. Upon reception of this processing, the data send section 112 sends the assigned data to the display-system program that is the address.

Preferred Embodiment 8

Figure 10:
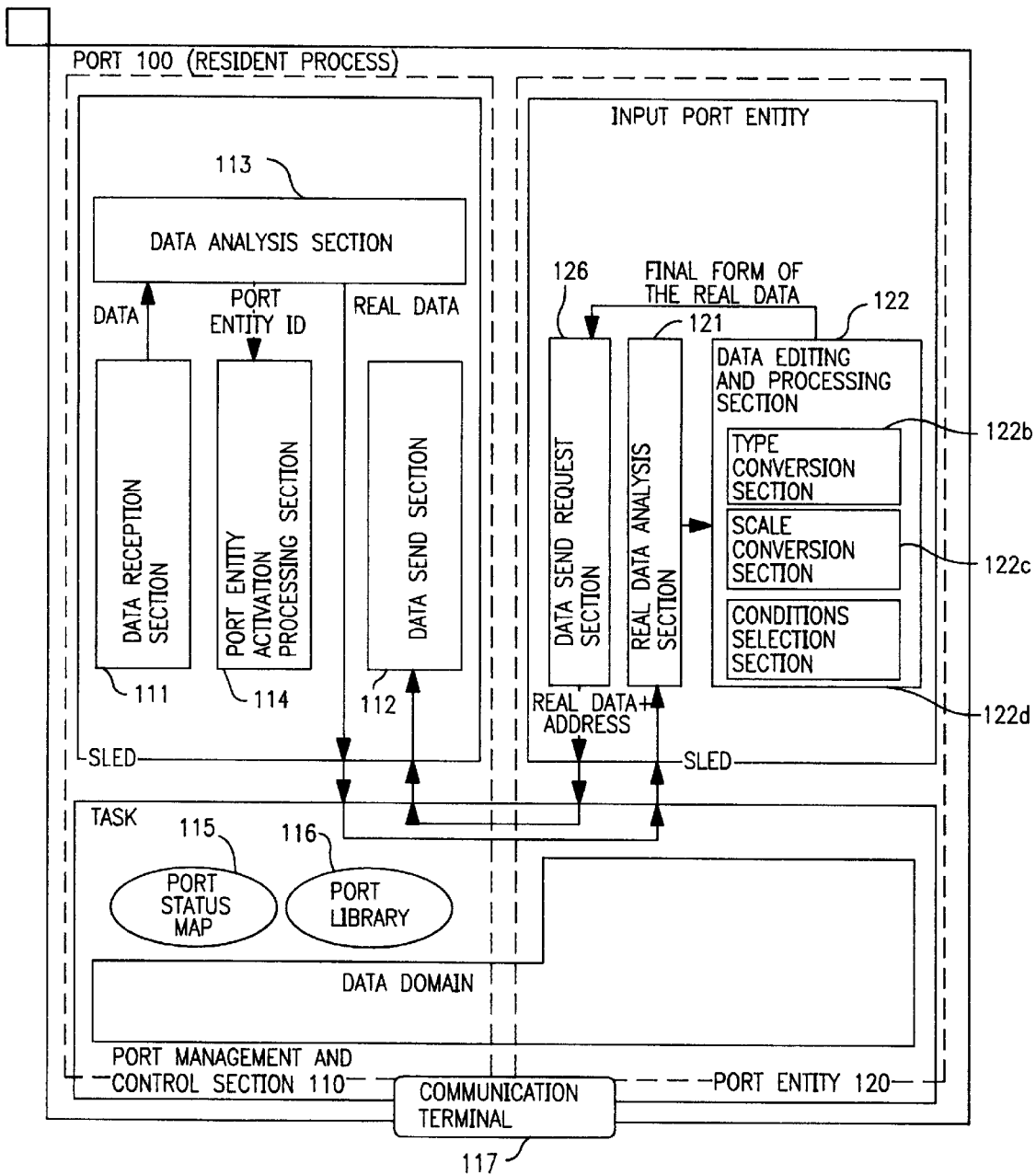
FIG. 10 is a block diagram showing the data format conversion mechanism of the input port as described in preferred embodiment 8 of the present invention.

FIG. 10 is a preferred embodiment of a input port that enables delivery of input data from the display-system program to the processing-system program following execution of format conversion of input data by the operator.

In FIG. 10, the data reception section 111, the data send section 112, the data analysis section 113, the port entity activation processing section 114, the real data analysis section 121, the type conversion section 122b, the scale conversion section 122c, and the conditions selection section 122d that are the data editing and processing section 122, the multiple address management section 124, and the data send request section 126 within each sled are realized as the internal functions of each sled.

Data received from the processing-system program via the socket, communications terminal 117, are transmitted through the data reception section 111 to the data analysis section 113 where data analysis is performed. As a result of data analysis, the port identity ID to be used and the real data are obtained; and the former, or the port identity ID, is delivered to the port entity activation processing section 114, and port entity activation is performed. The latter, or the real data, is delivered to the real data analysis section 121 of the display port entity through internal communication between the task and the sled, and, following data structural analysis, is delivered to the type conversion section 122b, the scale conversion section 122c, and the conditions selection section 122d that are the data editing and processing section 122. Within the type conversion section 122b, type conversion is performed, whereby the display data are converted from integer-type data to character-type data; and, within the scale conversion section 122c, scale conversion is performed according to the measurement/unit of the display data; and, within the conditions selection section 122d, only data that conforms to specified conditions is extracted.

Data that have completely undergone format transformation as stated above are delivered to the data send request section 126 as the final form of the real data. Here, what differs from the realization method of the present mechanism within the display port, is the fact that the processing-system program that is to receive the data is defined by a single meaning. Specifically, it is previously defined as an attribute in the port library, and is established as a port specification at the time of port activation processing. Through the performing of processing on this program, processing within the sled is simplified, and efficient transmission of data can be performed. Moreover, the data send request section 126 transmits the real data and the address to the data send section 112 via internal communication between the task and the sled. Upon reception of this processing, the data send section 112 sends the format-converted data to the processing-system program that is the address.

Preferred Embodiment 9

Figure 11:
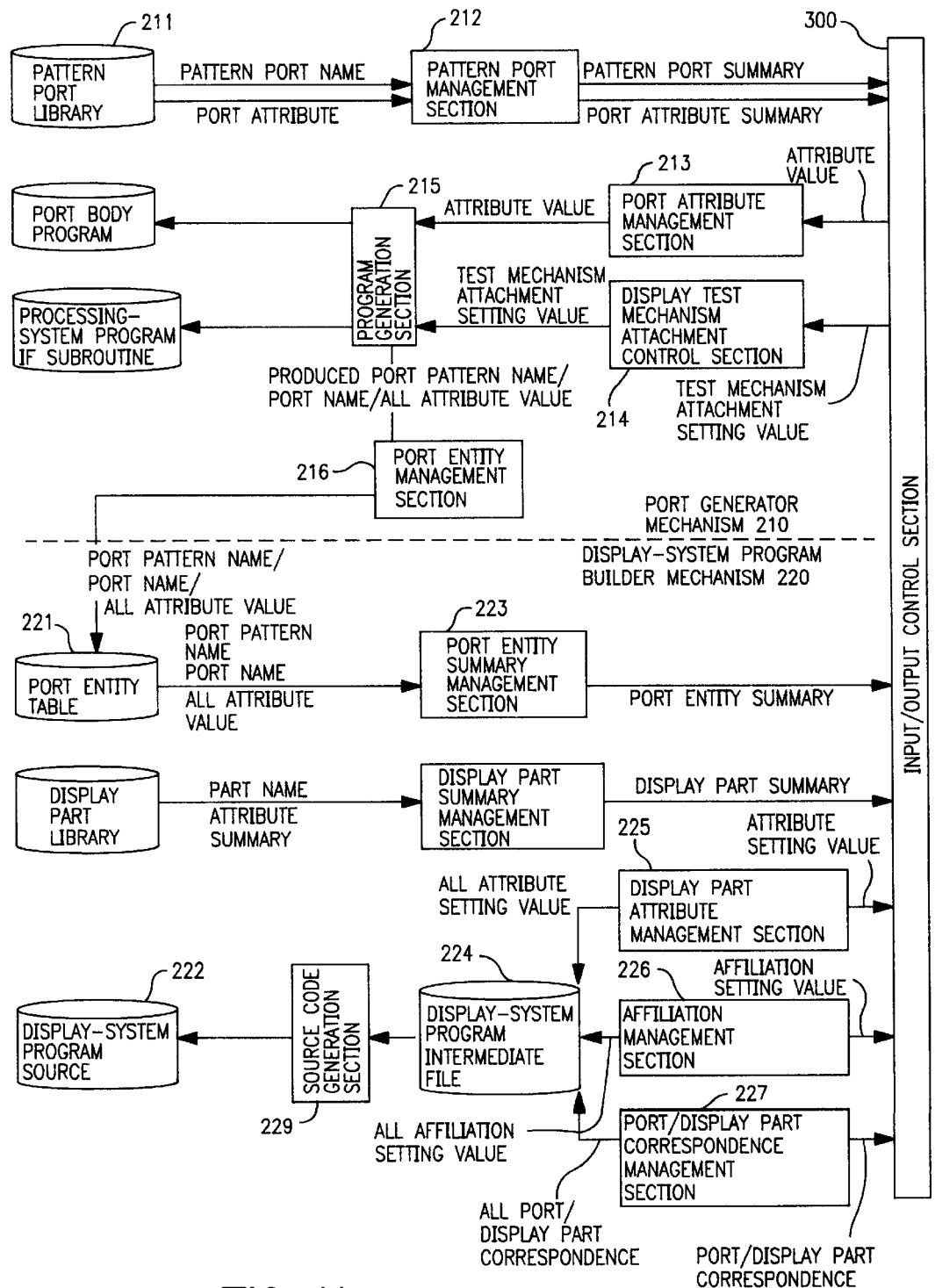
FIG. 11 is a block diagram showing an example of a computer system development method as described in preferred embodiment 9 of the present invention.

FIG. 11 is a block diagram showing a preferred embodiment for using the present invention for the realization of a computer system development method having a graphical user interface.

As shown in FIG. 11, numeral 211 denotes a data block for the realization of the port generator mechanism 210, numeral 212 denotes a pattern port management section, numeral 213 denotes a port attribute management section, numeral 214 denotes a display test mechanism attachment control section, numeral 215 denotes a program generation section, and numeral 216 denotes a port entity management section.

Also, references 211, 222, and 228 denotes, respectively, data blocks for realizing the display-system program builder mechanism 220; reference 211 denotes a pattern port library, numeral 222 denotes a display part library, and numeral 228 denotes a display-system program definition intermediate file.

Also, reference numeral 223 denotes a port entity summary management section, numeral 224 denotes a the display part summary management section, numeral 225 denotes a display part attribute management section, numeral 226 denotes an affiliation management section, reference numeral 227 denotes a port/display part correspondence management section, and reference numeral 229 denotes a source code generation section.

The pattern port library 211, in other words, within the port generator mechanism 210, maintains the port entity program which, for every function requested to the port, performs data exchanges between the pattern port name, its attributes, and the display program, and the program specifications to maintain the interface through the embedding of processing-system programs. These program specifications comprise the interface subroutines for the processing-system program.

In the present preferred embodiment, the pattern port management section 212 first refers to the pattern port name and its accompanying port attributes, and, as a summary of the pattern port and its accompanying attributes, performs a display to the developer via the input/output control section 300. The developer selects the pattern port for each data category required for communication through a port, and along with this, performs attribute value settings for the port generator mechanism 210 (the pattern port library 211) via the input/output control section 300, and the port attribute management section 213 acquires attribute values and transmits these attribute values to the program generation section 215.

The program generation section 215 generates a port entity program and processing system interface subroutine for the program specifications of the pattern port library 211, and, along with this, transmits the generated port pattern name, the port name, and all attribute values to the port entity management section 216. The port entity management section 216 stores the port pattern name, the port name, and all attribute values within the port entity table 221. Also, in the case where the developer sets a display test mechanism attachment, the display test mechanism attachment control section 214 transmits the display test mechanism attachment settings values to the program generation section 215.

In the case where the program generation section 215 receives display test mechanism attachment settings values from the display test mechanism attachment control section 214, it attaches a display test mechanism and generates a port entity program.

Within the port entity table 221 found within the display-system program builder mechanism 220 is stored corresponding to port pattern names, port names, and all attribute values generated by the port generator mechanism 210, and within the display parts library 222 is stored part names and attributes corresponding to display parts for the configuration of screens.

The display-system program builder mechanism 220 displays to the developer via the input/output control section 300 the display parts for performing screen settings and the port entity to be used. As for display parts, the display part summary management section 224 extracts part names and attributes from the display part library 222 and presents them in summary form using graphic icons; as for the port entity, the port entity summary management section 223 extracts port pattern names, port names, and all attribute values from the port entity table 221 and presents them in summary list format.

The developer performs screen settings through selection and placement from the display part summary, and along with performing attribute settings, fixes ports and display ports to be used for each screen, and furthermore, for affiliations between screens, uses exclusive parts to define these affiliation relationships, and performs settings for these as display system programs. Attribute values from placed display parts are received by the display part attribute management section 225; and, as for settings for affiliations between screens, these affiliated setting values are received by the affiliation management section 226; and, as for correspondence between ports and display parts, these are received by the port/display part correspondence management section 227; and each of the above are stored within the display-system program definition intermediate file 228. Following storage, the source code generation section 229 reads in the display-system program definition intermediate file 228, and creates a source code for the display-system program.

Preferred Embodiment 10

Figure 12:
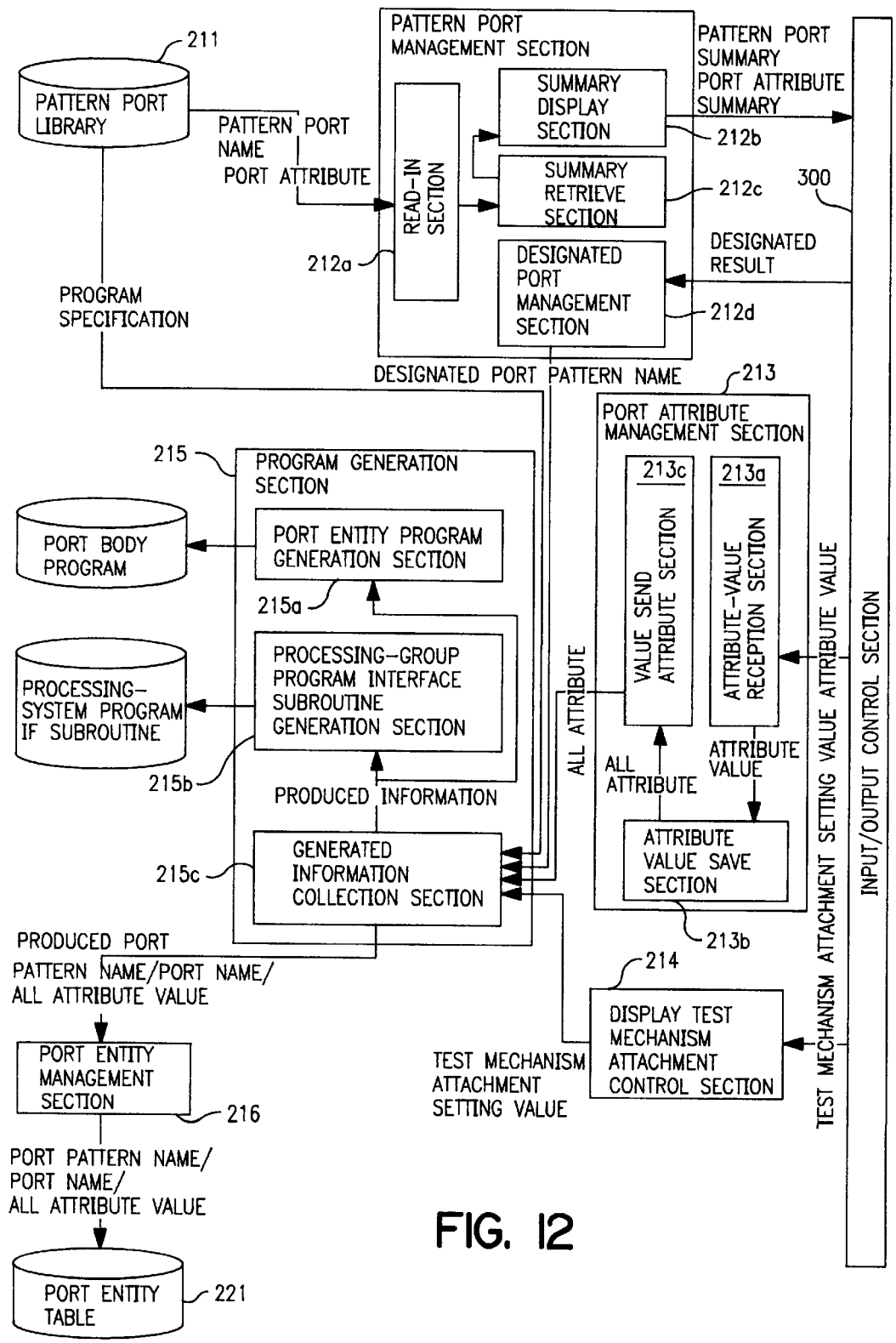
FIG. 12 is a block diagram showing the port generator mechanism as described in preferred embodiment 10 of the present invention.

FIG. 12 shows a configuration of a port generation mechanism that is an embodiment of the present invention.

In FIG. 12, numeral 212 denotes the pattern port management section, which is comprised of the read-in section 212a, the summary display section 212b, the summary retrieve section 212c, and the designated port management section 212d.

Numeral 213 denotes the port attribute management section, which is comprised of the attribute value reception section 213a, the attribute value save section 213b, and the attribute value send section 213c.

Numeral 215 denotes a program generation section, which is comprised of the port entity program generation section 215a, the processing-system program interface subroutine generation section 215b, and the generated information collection section 215c.

Since the other function blocks in FIG. 12 are the same as those found in FIG. 11, they will not be explained again here.

The read-in section 212a found within the pattern port management section 212 of the present embodiment reads in pattern port names and port attributes from the pattern port library 211, and transmits these to the summary retrieve section 212c. When the input data format and the output data format are specified within the summary retrieve section 212c, a retrieving is performed to determine usable pattern ports and their attributes, and these results are transmitted to the summary display section 212b. At this time, in the case where there are no special designations, all of the pattern ports and their attributes are transmitted to the summary display section 212b. Upon reception of these, the summary display section 212b displays to the developer via the input/output control section 300 the pattern ports and their port attributes.

After the developer, using a pointing device such as a mouse, etc., designates from the summary port patterns to be used, the designation results are transmitted to the designated port management section 212d.

The designated port management section 212d identifies the pattern ports to be used from the designated places, and transmits the designated pattern port names to the program generation section 215. Then, in the case where the developer performs attribute value settings for the pattern ports to be used, the attribute value reception section 213a found within the port attribute management section 213 receives the set attribute values, and saves these in the sequential attribute value save section 213b.

Upon completion of the attribute value settings, the attribute value send section 213c extracts all of the attribute values saved within the attribute value save section 213b, and transmits these to the program generation section 215. Also, when the developer has previously set a display test mechanism attachment for a port, the test mechanism attachment setting values are transmitted from the display test mechanism attachment control section 214 to the program generation section 215.

Based on the above processes, the generated information collection section 215c found within the program generation section 215 collects the designated port pattern name from the pattern port management section 212, the program specifications from the pattern port library 211, all attribute values from the port attribute management section 213, and the test mechanism attachment setting values from the display test mechanism attachment control section 214, and transmits these as generation information to the port entity program generation section 215a and the processing-system program interface subroutine generation section 215b, and, along with this, transmits the generated port pattern names, the port names, and all port attributes to the port entity management section 216.

The port entity program generation section 215a and the processing-system program interface subroutine generation section 215b, based on the generated information, create each port entity program and processing-system program interface subroutine, and the port entity management section 216 stores the generated port pattern names, port names, and all attributes within the port entity table 221.

Preferred Embodiment 11

Figure 13:
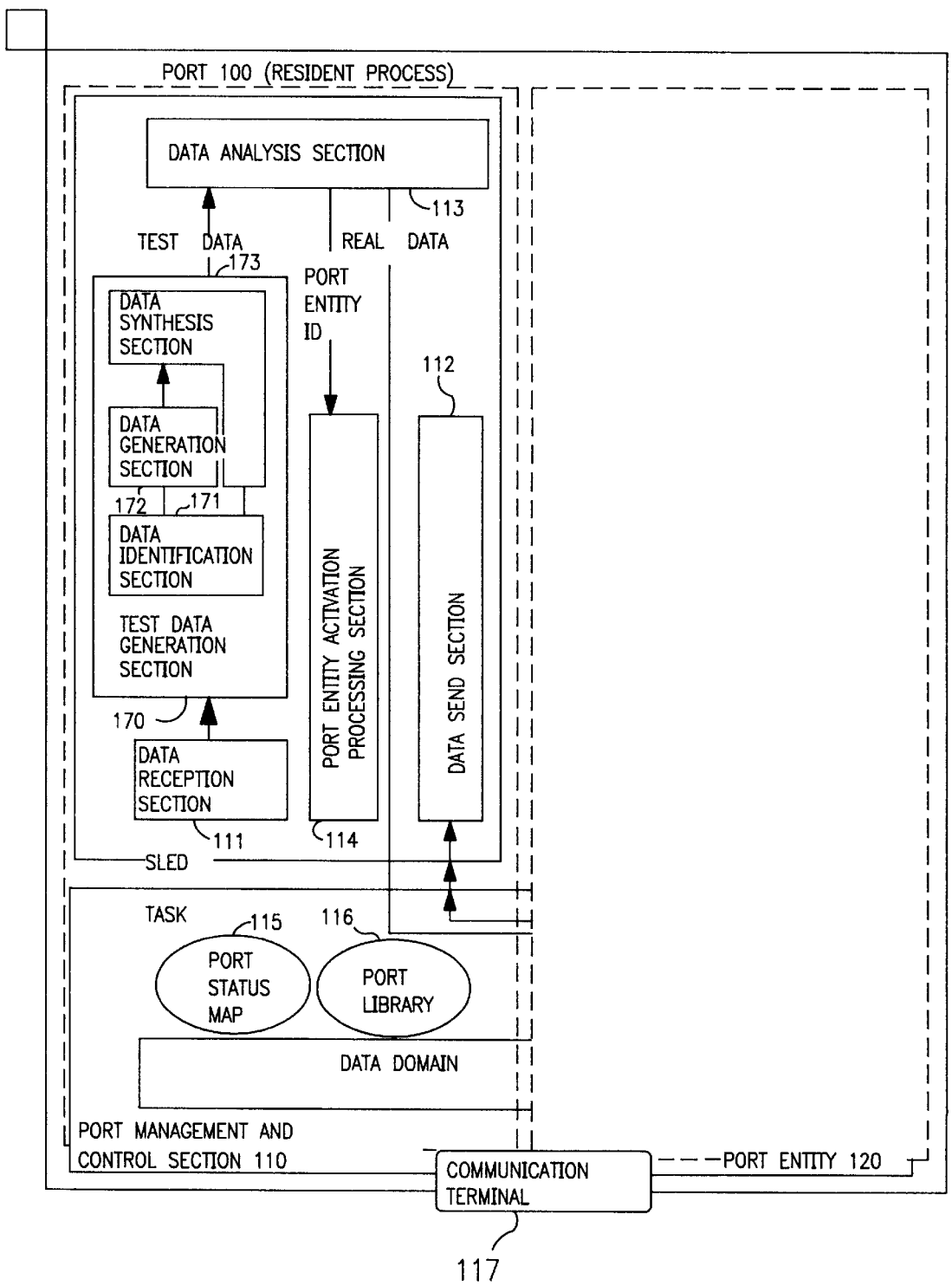
FIG. 13 is a block diagram showing the test mechanism of the display port as described in preferred embodiment 11 of the present invention.
Figure 14:
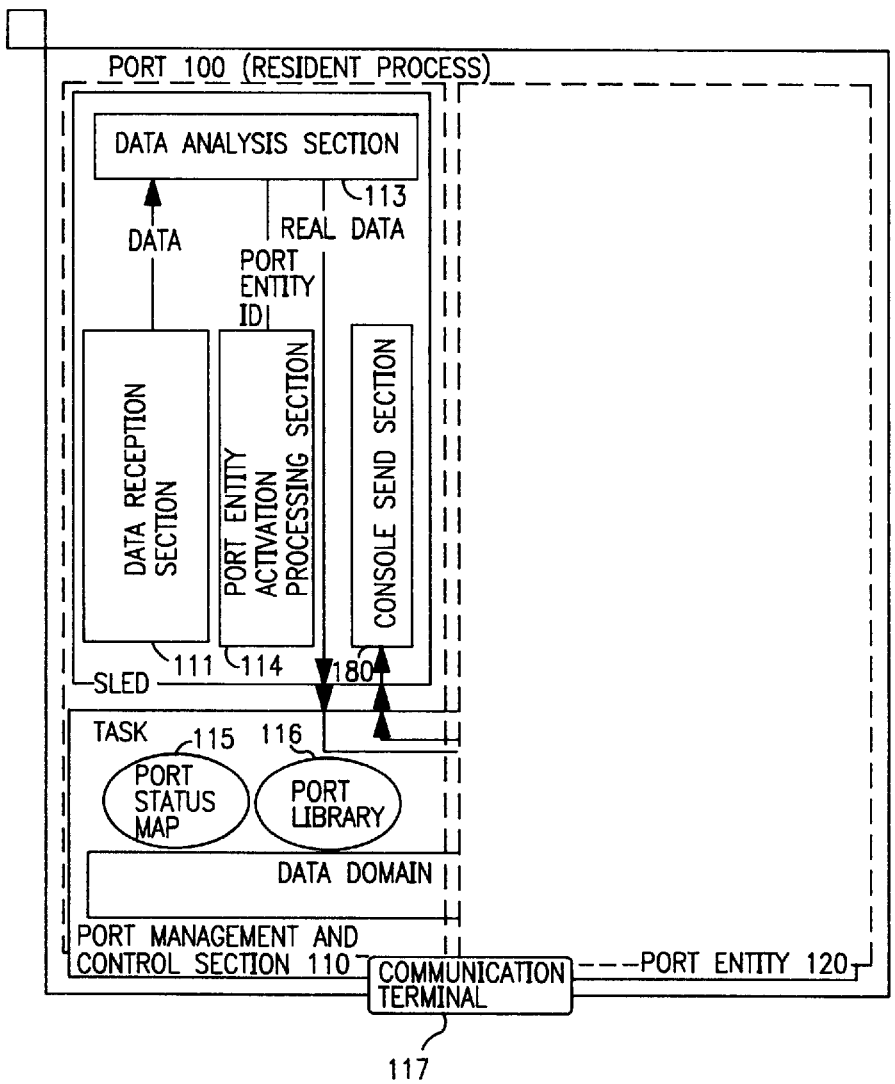
FIG. 14 is a block diagram showing the test mechanism of the input port as described in preferred embodiment 11 of the present invention.
Figure 15:
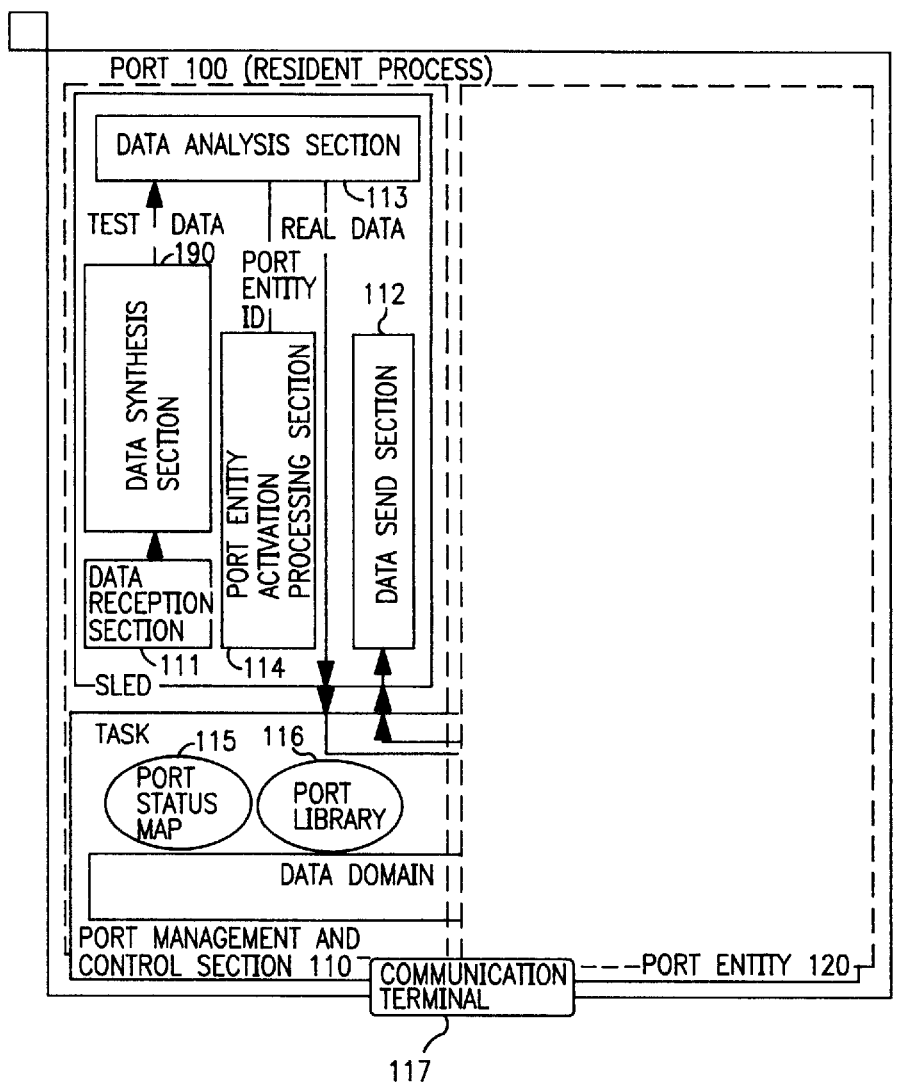
FIG. 15 is a block diagram showing the test mechanism of the control port as described in preferred embodiment 11 of the present invention.

FIG. 13 is a block diagram showing the display port test mechanism that is a preferred embodiment of the present invention; FIG. 14 is a block diagram showing the input port test mechanism; FIG. 15 is a block diagram showing the control port test mechanism.

Within FIG. 13, 170 is the test data generation section, and is comprised of the data identification section 171, the data generation section 172, and the data synthesis section 173.

The data identification section 171 has the function of identifying whether input from the console is a normally established distribution data generation factor or test data.

The data generation section 172 has the function of generating normal establishment distribution data.

The data synthesis section 173 has the function of synthesizing data generated from console input or from the data generation section 172 into a data format that can be manipulated by the port.

Here, during port entity program generation by the port generator mechanism 210, when a test mechanism attachment is set, the test data generation section 170 is attached to the ordinary display port. Furthermore, the communication terminal 117 of the port is connected to the console. Here, when a normally established distribution data generation factor is inputted from the console, just the same as in ordinary port processing, the data reception section 111 receives the data, and next it transmits the data to the test data generation section 170. The data identification section 171 within the test data generation section 170 identifies the data as a normally established distribution generation factor, and transmits the data generation designation values to the data generation section 172. Upon reception of this, the data generation section 172 generates data following the normally established distribution, and transmits the data to the data synthesis section 173.

The data synthesis section 173 synthesizes the generated data together with the data structure template of the display port and transmits this as test data to the data analysis section 113.

Conversely, in the case where input from the console is test data itself, the test data are transmitted from the data identification section 171 directly to the data synthesis section 173, and the data are synthesized in the same way as described above, and then transmitted as test data to the data analysis section 113.

In FIG. 14, numeral 180 dentes the console send section. This console send section 180 fixes the data send address within the console and performs a data send. Here, during port entity program generation by the port generator mechanism 210, when a test mechanism attachment is set, instead of the data send section 112 of the ordinary input port, the console send section 180 is attached. Furthermore, the communication terminal 117 is connected to the console. Ordinary processing is executed within the input port, and when sent data are transmitted to the console send section 180, the console send section 180 sends the data via the communication terminal 117, and displays the data on the console.

In FIG. 15, numeral 190 denotes the data synthesis section, which has the function of synthesizing received data into a data format that enables port manipulation. During port entity program generation by the port generator mechanism 210, when a test mechanism attachment is set, the data synthesis section 190 is attached to the ordinary display port. Furthermore, the communication terminal 117 of that port is connected to the console. Here, when test data themselves are inputted from the console, just as in ordinary port processing, the data reception section 111 receives the data and transmits the data to the data synthesis section 190. The data synthesis section 190 synthesizes the generated data together with the data structure template of the display port, and transmits them as test data to the data analysis section 113.

Preferred Embodiment 12

Figure 16:
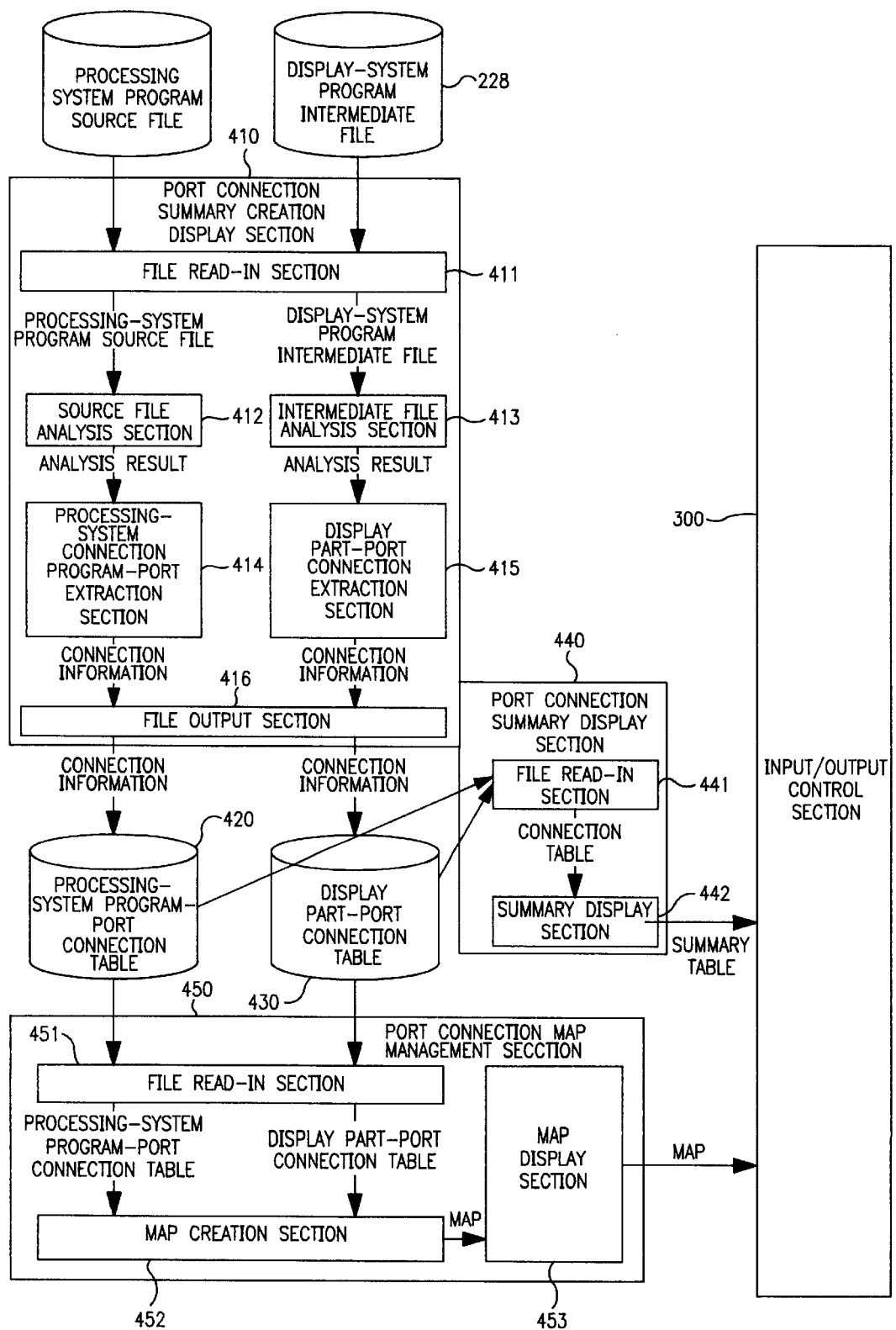
FIG. 16 is a block diagram showing the static verification mechanism as described in preferred embodiment 12 of the present invention.

FIG. 16 is a block diagram for the realization of the static verification mechanism that is a preferred embodiment of the present invention. In FIG. 16, numeral 410 denotes a port connection summary creation display section that creates information concerning connections among the port and the processing-system program and the display-system program, and is comprised of the file read-in section 411, the source file analysis section 412, the intermediate file analysis section 413, the processing-system program-port connection extraction section 414, the display parts-port connection extraction section 415, and the file output section 416.

Numeral 420 denotes a processing-system program-port connection table that stores the connection relationships between the processing-system program and the port; numeral 430 shows a display parts-port connection table that stores the connection relationships between each display part and the port.

Numeral 440 denotes a port connection summary display section, and is comprised of the file read-in section 441 and the summary display section 442. Based on data obtained from the processing-system program-port connection table 420 and the display parts-port connection table 430, this port connection summary display section 440 has the function of displaying a summary of port connections.

Numeral 450 denotes a port connection map management section, and is comprised of the file read-in section 451, the map creation section 452, and the map display section 453. This port connection map management section 450 has the function of displaying a connection map among three elements, the processing-system program, display parts, and the port, as obtained from the processing-system program-port connection table 420 and the display parts-port connection table 430.

The file read-in section 411 found within the port connection summary creation display section 410 of the present embodiment reads in the source file of the processing-system program and the display-system program intermediately defining file 228, and transmits the source file of the processing-system program to the source file analysis section 412, and, along with this, transmits the display-system program intermediately defining file 228 to the intermediate file analysis section 413.

Here, the analysis of the processing-system program source file is executed within the source file analysis section 412. The processing-system program-port connection extraction section 414 that receives these analysis results extracts only connection information from these results and, after converting this information into table storage format, outputs this connection information data to the file output section 416.

In the same way as described above, the display-system program definition intermediate file first undergoes analysis within the intermediate file analysis section 413, and the analysis results are delivered to the display parts-port connection extraction section 415. Here, the display parts-port connection extraction section 415 extracts from the analysis results only connection information, and, after converting the information into table storage format, transmits the information to the file output section 416. The file output section 416 stores the connection relationship between the processing-system program and the port within the processing system program-port connection table 420, and, along with this, stores the connection relationship between the display parts and the port within the display parts-port connection table 430.

Within the port connection summary display section 440, the processing-system program-port connection table 420 and the display parts-port connection table 430 that stored the connection information are received at the file read-in section 441, and delivers these to the summary display section 442. Moreover, the summary display section 442 presents to the developer via the input/output control section 300 the connection between the processing-system program and the port, and the connection between the display parts and the port.

The file read-in section 451 within the port connection map management section 450 reads in the contents of the processing-system program-port connection table 420 and the display parts-port connection table 430, and delivers the data to the map creation section 452. The map creation section 452 extracts connection information among three elements, the processing-system program, the port, and the display parts, as obtained from information concerning the connections among the port and the processing-system program, and the port and the display parts. The map display section 453 presents this connection map to the developer via the input/output control section 300.

Preferred Embodiment 13

Figure 17:
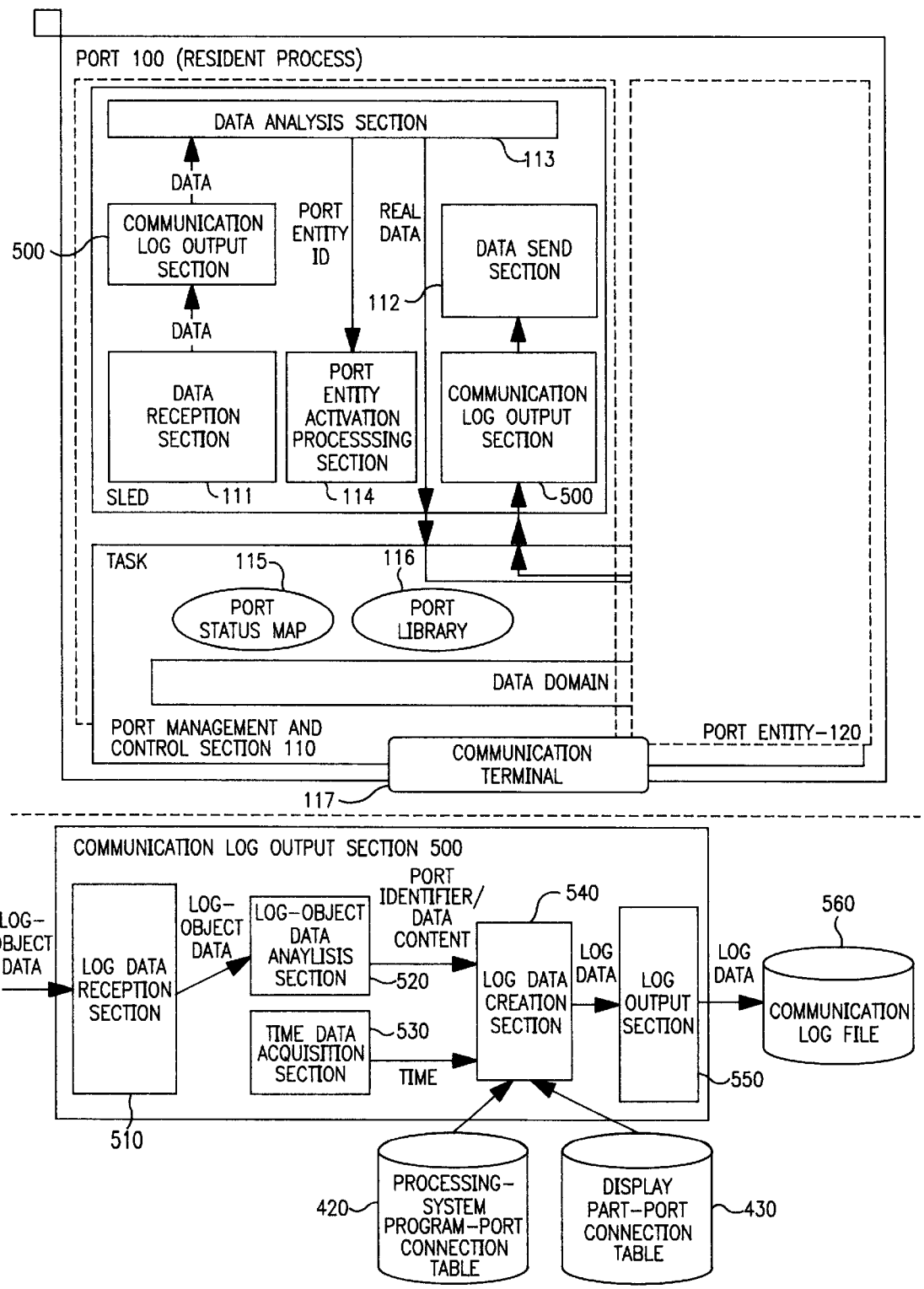
FIG. 17 is a block diagram showing the dynamic verification mechanism as described in preferred embodiment 13 of the present invention.

FIG. 17(a) is a block diagram for the realization of a dynamic verification mechanism that is a preferred embodiment of the present invention; and FIG. 17(b) is a block diagram that shows the details of the communication log output section.

Within the port 100 that acts as the resident process, numeral 500 denotes the communication log output section, which has the function of receiving the data contents and the data supply time from the processing-system program for the display port, receiving the data contents and the data supply time from the input port to the processing-system program, receiving the data contents and the data supply time from the processing-system program to the control port, and receiving the identifiers, etc., of the port, the processing-system program, and the display-system program, and of displaying this information.

Within the communication log output section 500, the log data reception section 510 receives either data received at the port from the processing-system program or data sent from the port for the processing-system program, and transmits the data to the log-object data analysis section 520.

The log-object data analysis section 520 acquires through data analysis data contents and the identifier of the port that is to become the object, and delivers this information to the log data creation section 540. The time data acquisition section 530 acquires time data from the operating system (OS), and delivers the data to the log data creation section 540.

The log data creation section 540 also acquires from the processing-system program-port connection table 420 and the display parts-port connection table 430 the identifiers of the processing-system program and the display-system program to be connected to the port.

The log data creation section 540 creates as log data the time, data contents, the port identifier, the display-system program identifier, and the processing-system program identifier obtained in the above-stated manner, and delivers this information to the log output section 550.

Log data delivered to the log output section 550 is then stored in the communication log file 560.

Preferred Embodiment 14

Figure 18:
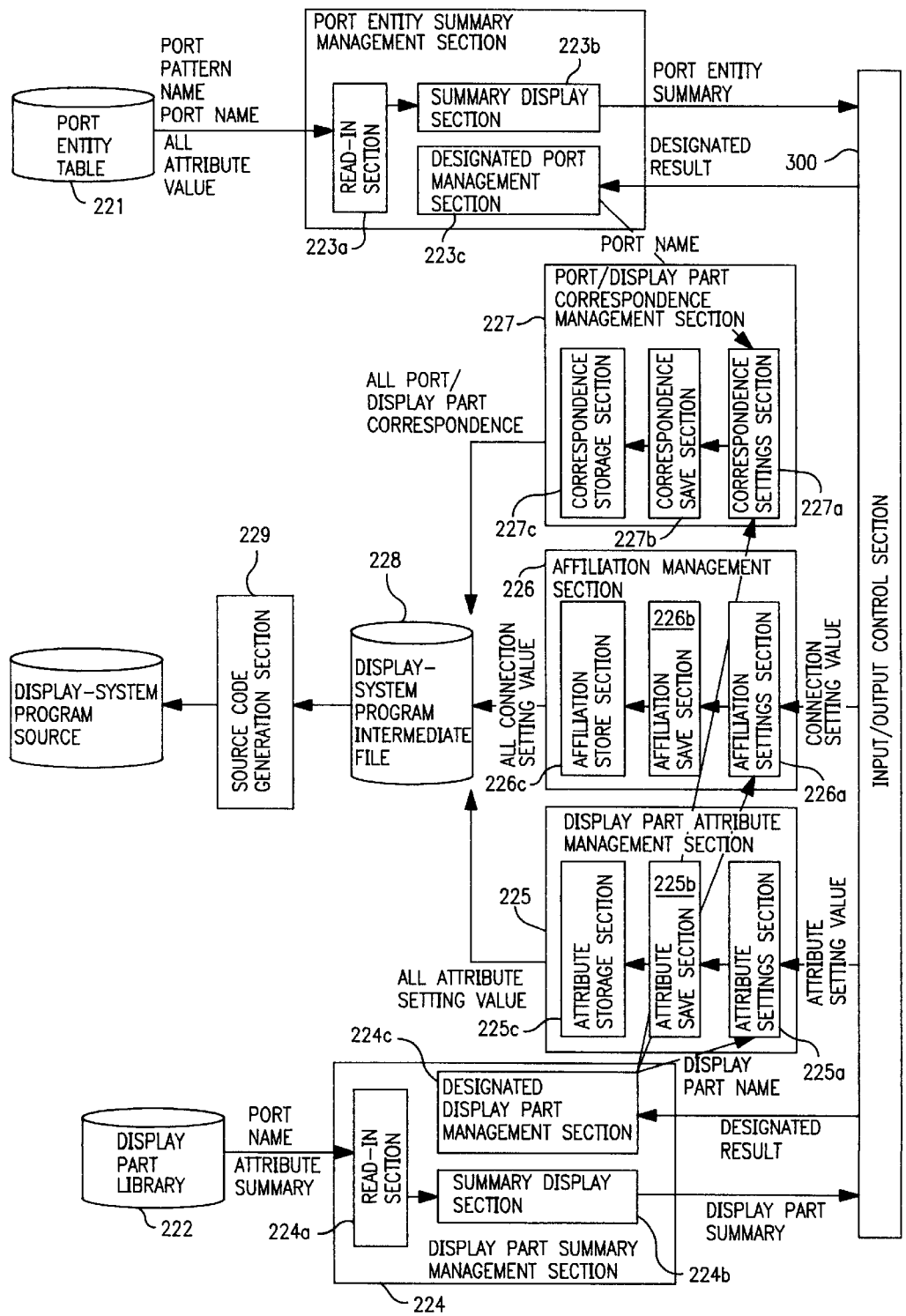
FIG. 18 is a block diagram showing the display-system program builder mechanism as described in preferred embodiment 14 of the present invention.

FIG. 18 is a block diagram that shows a preferred embodiment of the display-system program builder mechanism.

In FIG. 18, numeral 223 denotes the port entity summary management section, and is comprised of the read-in section 223a, the summary display section 223b, and the designated port management section 223c.

Numeral 224 denotes the display parts summary management section, and is comprised of the read-in section 224a, the summary display section 224b, and the designated display parts management section 224c.

Numeral 225 denotes the display parts attribute management section, and is comprised of the attribute settings section 225a, the attribute save section 225b, and the attribute storage section 225c.

Numeral 226 denotes the affiliation management section, and is comprised of the affiliation settings section 226a, the affiliation save section 226b, and the affiliation storage section 226c.

Numeral 227 denotes the port/display part correspondence management section, and is comprised of the correspondence settings section 227a, the correspondence save section 227b, and the correspondence storage section 227c.

In FIG. 18, display part are stored within the display parts library 222 is a form corresponding to the classifications of the present embodiment 14. The read-in section 224a within the display part summary management section 224 reads in by classification display parts from the display part library 222, and transmits these to the summary display section 224b. The summary display section 224b presents to the developer via the input/output control section 300 each of the attributes of the display parts in the form of a graphic-icon summary that expresses the patterns of the display parts. Using a pointing device, etc., the developer performs designations for the presented display-part summary, and the designation results are transmitted via the input/output control section 300 to the designated display part management section 224c.

The designated display part management section 224c identifies display parts from the designation results, and transmits the display part names to the display part attribute management section 225, the affiliation management section 226, and the port/display part correspondence management section 227.

The attribute settings section 225a that received the display part names from the designated display part management section 224c presents to the developer via the input/output control section 300 the input domain for attribute value settings, and the inputted attribute value settings are saved within the sequential attribute save section 225b via the input/output control section 300.

In the case where the display parts are screen affiliation parts, the affiliation settings section 226a within the affiliation management section 226 that received the display part names presents to the developer via the input/output control section 300 the input domain for affiliation settings, and the inputted affiliation settings are saved within the sequential affiliation save section 226b.

Moreover, in the case where the relationship between the display parts and the port to be used has been designated, when the correspondence settings section 227a of the port/display part correspondence management section 227 receives the display part names, the read-in section 223a of the port entity summary management section 223 reads in the port pattern names, the port names, and all of the attribute values from the port entity table 221, and transmits these to the summary display section 223b. Here, the summary display section 223b presents to the developer, via the input/output control section 300, in summary format a port entity summary of port pattern names, port names, and all attribute settings for all ports. When a port is designated for these summary results with a pointing device, etc., the designation results are transmitted via the input/output control section 300 to the designated port management section 223c. Here, the designated port management section 223c identifies a port name from the designation results, and communicates this port name to the correspondence settings section 227a. Upon reception of this, the correspondence settings section 227a saves the display parts and the port name as a data set within the sequential correspondence save section 227b.

After the same settings have been repeated, and a request for source generation has been made to the display-system program builder mechanism 220, the attribute storage section 225c extracts all of the attribute values from the attribute save section 225b, the affiliation storage section 226c extracts all of the affiliation setting values from the affiliation save section 226b, and the correspondence strage section 227c extracts all information concerning correspondence between all ports and the display parts from the correspondence save section 227b, and each of these is stored within the display-system program definition intermediate file 228.

Furthermore, the source code generation section 229 performs source code creation from the display-system program definition intermediate file 228 obtained in the manner described above.

Preferred Embodiment 15

Figure 19:
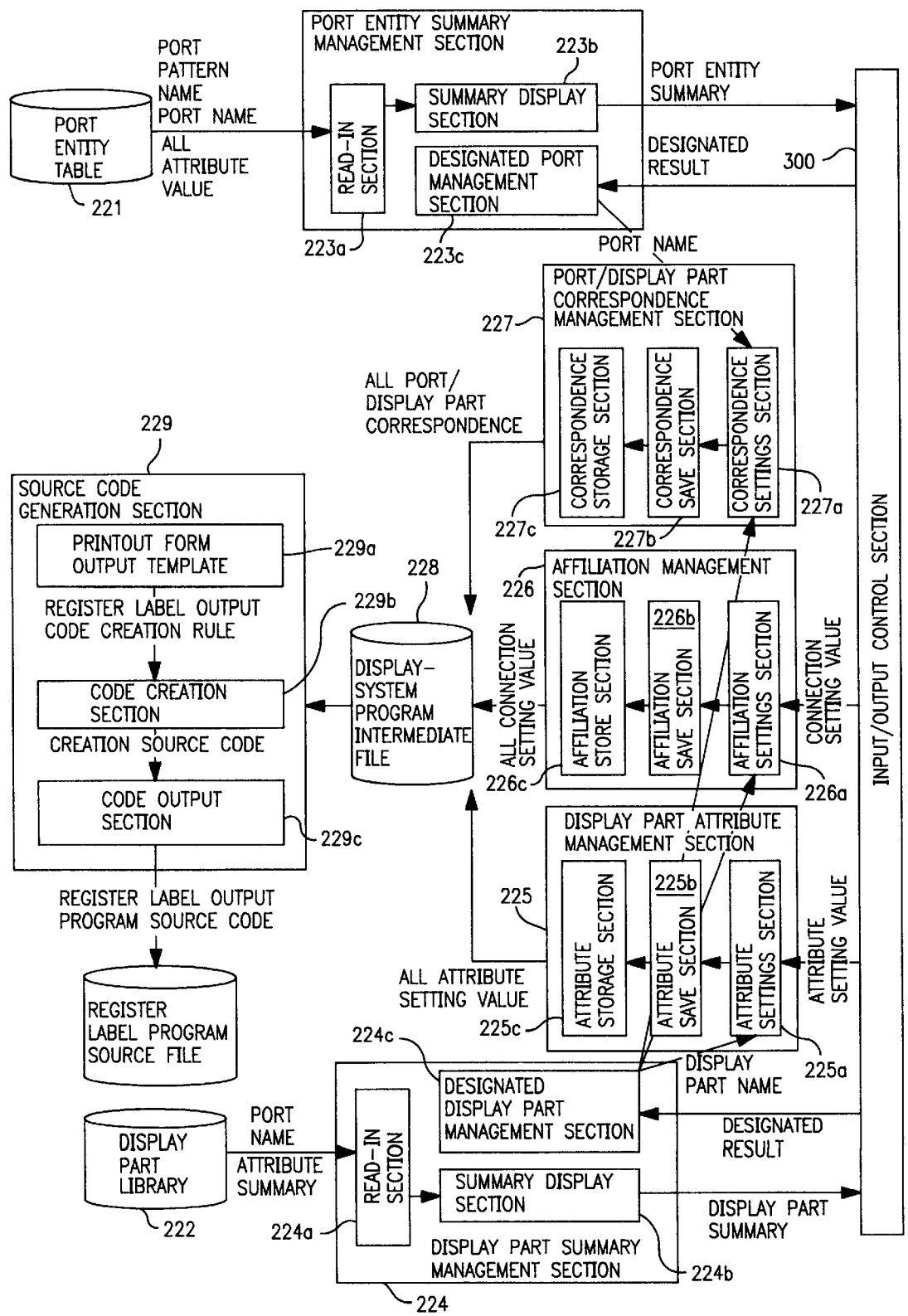
FIG. 19 is a block diagram showing the register label output modification mechanism as described in preferred embodiment 15 of the present invention.

FIG. 19 is a block diagram showing a configuration found within Preferred Embodiment 14. The present preferred embodiment consists of an attachment for register label output to the program builder mechanism 220 described in Preferred Embodiment 14, and is designed to realize a register label output program that enables the generation not only of source code for the display-system program, but also the generation of source code for register label output.

In FIG. 19, since the configurations of the port entity summary management section 223, the display part summary management section 224, the display part attribute management section 225, the affiliation management section 226, and the port/display part correspondence management section 227, etc., are the same as those found in Preferred Embodiment 14 (FIG. 18), they will not be explained again here.

Within FIG. 19, numeral 229 denotes a source code generation section, and, for register label output, the register label output template 229*a*, the code creation section 229*b*, and the code output section 229*c*, have been attached.

During the generation of register-label output source code, the code creation section 229*b* within the source code generation section 229, by using the display-system program definition intermediate file 228, refers to the register-label code creation rules of the printout form code output template 229*a*, and performs source code generation. The source code created in this way is transmitted to the code output section 229*c*, and the code output section 229*c* stores as a file the source code of the register label output program.

What we claim is:

1. An information processing apparatus comprising:
 a processing-system program group for processing data and outputting resulting data that forms the basis for display on the interactive screens;
 a display-system program group, independent of said processing system program group, for processing input data into a discretionary display format and for displaying the input data on the interactive screens in the discretionary display format and
 communication means for mediating between said processing-system program group and said display-system program group so as to maintain functional independence between said processing-system program group and said display-system program group;
 the communication means comprising:
  a display port receiving the resulting data from said processing-system program group and sending the resulting data as input data to a program in said display-system program group;
  an input port for receiving output data generated by a program in said display-system program group in response to operations by the operator, the output data to be communicated to the processing-system program group, and for sending the output data, as data, to a prescribed processing-system program in the processing-system group; and
  a control port for, where resulting data has been generated from the prescribed processing-system program that must be immediately communicated to the operator displaying such resulting data on a specified interactive screen by directly activating a display-system program in said display-system program group and transmitting the resulting data to the display-system program.

2. The information processing apparatus of claim 1 wherein said communication means further comprises:
 multiple-address management means for transmitting resulting data received from said processing-system program as display-system program input that corresponds to multiple differing interactive screens.

3. The information processing apparatus of claim 1 wherein said communication means further comprises:
 data storage means for receiving and serially storing data received by said communication means.

4. The information processing apparatus of claim 1 wherein said communication means further comprises:
 a reception-side program group management means for, when resulting data is to be transferred from the processing-system program to the display-system program, monitoring an execution status of said display-system program.

5. The information processing apparatus of claim 1 wherein said communication means further comprises:
 a display port entity which comprises a data editing and management means comprising:
  a type conversion means for performing data type conversions: and
  a scale conversion means for performing conversion of data measurements or data units; and
 conditions selection means for extracting only data that conform to specified condition.

6. The information processing apparatus of claim 1 wherein said communication means further comprises:
 real data analysis means for performing data analysis on data received from multiple differing processing-system programs; and
 record operation means for storing only data extracted as an object of record operations within said real data analysis means.

7. An information processing apparatus of claim 1 wherein said communication means further comprises:
 omitted data operations means for, where data observed at regular intervals are to be manipulated, determining whether observation point data are omitted when the data are originally to have been observed and, where there are omitted data, performing operations on the omitted data.

8. The information processing apparatus of claim 1 wherein said communication means further comprises:
 an input port entity comprising:
  type conversion means for performing data type conversions; and
  scale conversion means for performing conversion of data measurements or data units; and
 conditions selection means for extracting only data that conform to specified conditions.

9. The information processing apparatus of claim 1 wherein said communication means further comprising:
 a port generator means comprising:
  pattern port management means for extracting, from a pattern port library, necessary functions for each data item;
  program generation means that generates port entity programs to perform data exchanges with display-system programs;
  processing-system program interface subroutine means for interfacing with the processing program; and display test function attachment control means for selectively assigning test function attachment setting values to realize test functions for said program generator means.

10. The information processing apparatus of claim 9 wherein said port generator means further comprising:

a pattern port management comprising:
  summary display means for reading pattern ports from the pattern port library and displaying a summary of pattern ports on the interactive screen;
  designated port management means for, based on the displayed summary, receiving inputted port designation results; and
  summary retrieve means for performing a pattern port retrieve from the port types, an input data format to the port, and an output data format, and for delivering the retrieved data to said summary display means.

11. The information processing apparatus of claim 9 wherein said display port further comprising a test data generation means that causes a pseudo generation of data values inputted from the interactive screen or of data values that follow normal distributions designated for the display-system program;

said input port further comprising a console send means for displaying on the interactive screen data values inputted upon the interactive screen; and said control port further comprising a data synthesis means for replacing the data input function from the interactive screen for a reception function from the processing-system program.

12. The information processing apparatus of claim 9 wherein said communication means comprises:

a port connection summary creation display means for analyzing the source code of the processing program and showing which part of the processing-system program is connected to which port;

a port connection summary display means for defining through the builder the display-system program through the builder, and for showing from definition data at the time of generation for each port which port is connected to which display and input parts of the screen; and a port connection map management means for creating a connection map from the summary data of said port connection summary creation display means and of the port connection summary display means for showing connections among the processing-system program, the display parts, and the port.

13. The information processing apparatus of claim 9 wherein said communication means comprises:

a communication log output means for collecting and displaying along a time axis data contents and a data supply time from the processing-system program to the display port, the data contents and the data supply time from the input port to the processing-system program, and the data contents and the data supply time from the processing-system program to the control port.

14. The information processing apparatus of claim 9 wherein said communication means further comprises:

a display-system program builder means comprising:
  a display part summary management means that allows reading from the display part library display parts stored by classification, and outputs to the interactive screen as a display part summary;
  an attribute management means for storing within the display-system program intermediate file a display part attribute setting values inputted with the interactive screen;
  an associated management means for storing within the display-system program definition intermediate file affiliation setting values which are input through the interactive screen; and
  a port/display part correspondence management means for receiving port names from the port entity summary management means and for storing port names within said display-system program definition intermediate file.

15. The information processing apparatus of claim 14 wherein said program builder means comprises a source code generation means, which source code generation means comprises:

a printout form output template for performing conversions from the display-system program to the printout form output program in order to change the output device for screen display defined through the display-system program from the display apparatus to the printing apparatus.

* * * * *